United States Patent
Kawahara et al.

(10) Patent No.: US 7,660,510 B2
(45) Date of Patent: Feb. 9, 2010

(54) DEVICE FOR CREATING CONTENT FROM MULTIPLE VIDEO AND/OR AUDIO MATERIALS AND METHOD THEREFOR

(75) Inventors: Minoru Kawahara, Kanagawa (JP);
Yoshihiro Murakami, Kanagawa (JP);
Mitsutoshi Shinkai, Kanagawa (JP);
Masataka Mukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 959 days.

(21) Appl. No.: 10/220,002

(22) PCT Filed: Dec. 28, 2001

(86) PCT No.: PCT/JP01/11687
§ 371 (c)(1),
(2), (4) Date: Aug. 26, 2002

(87) PCT Pub. No.: WO02/054762
PCT Pub. Date: Jul. 11, 2002

(65) Prior Publication Data
US 2003/0026592 A1 Feb. 6, 2003

(30) Foreign Application Priority Data
Dec. 28, 2000 (JP) .............................. 2000-403473

(51) Int. Cl.
*G11B 27/00* (2006.01)
*H04N 5/93* (2006.01)
*H04N 7/00* (2006.01)
*H04N 5/00* (2006.01)
*G06F 3/00* (2006.01)

(52) U.S. Cl. .............................. 386/55; 386/52; 386/95; 386/125; 386/126; 369/83; 715/723

(58) Field of Classification Search .................. 386/55, 386/52, 4; 360/13; 369/83; 715/723
See application file for complete search history.

(56) References Cited

U.S. PATENT DOCUMENTS 5,590,262 A * 12/1996 Isadore-Barreca ....... 715/500.1
5,649,171 A    7/1997 Craven et al.

(Continued)

FOREIGN PATENT DOCUMENTS

EP    0 803 873    10/1997

(Continued)

OTHER PUBLICATIONS

"A Java Fork/Join Framework" by Doug Lea.*
Java Grande Conference: Proceddings of the ACM 2000 conference on Java Grande 2000, San Francisco, California, United State Jun. 3-4, 2000.*
"Process Identifier" http://impi.nist.gov/impi-report/impi-report-node48.html, Mar. 22, 1999.*

*Primary Examiner*—Thai Tran
*Assistant Examiner*—Daquan Zhao
(74) *Attorney, Agent, or Firm*—Frommer Lawrence & Haug LLP; William S. Frommer; Paul A. Levy

(57) ABSTRACT

An EPL maker (10) is composed mainly of editing terminals (15), (16) and (17) each reading and decoding each of highly compressed sub materials to produce a material data and make an EPL while displaying, on a monitor, a video based on the material data. The EPL includes identification information for identification of a material used in editing and a format declare state for defining a format of at least a certain material. The EPLs made by the editing terminals (15), (16) and (17) are stored into an EPL storage unit (18). The EPLs stored in the EPL storage unit (18) are read by an edit controller (20). The edit controller (20) makes an edit control signal based on the EPLs, and supplies the signal to a content maker (30). Thus, an editing can be executed with having not to pool the materials once on hand and with labors and costs.

35 Claims, 23 Drawing Sheets

U.S. PATENT DOCUMENTS

| | | |
|---|---|---|
| 5,801,685 A | 9/1998 | Miller et al. |
| 6,351,765 B1 | 2/2002 | Pietropaolo et al. |
| 6,415,095 B1 * | 7/2002 | Morishima et al. ............ 386/55 |
| 6,587,590 B1 * | 7/2003 | Pan ............................ 382/250 |
| 7,123,814 B2 * | 10/2006 | David .......................... 386/52 |
| 2002/0076198 A1 * | 6/2002 | Savoie ......................... 386/55 |

FOREIGN PATENT DOCUMENTS

| | | |
|---|---|---|
| JP | 09 18752 | 1/1997 |
| JP | 09 65279 | 3/1997 |
| JP | 10 51718 | 2/1998 |
| JP | 10 98677 | 4/1998 |
| JP | 10 150631 | 6/1998 |
| JP | 10 164478 | 6/1998 |
| JP | 10 191163 | 7/1998 |
| JP | 10 243326 | 9/1998 |
| JP | 10 257440 | 9/1998 |
| JP | 10 285537 | 10/1998 |
| JP | 10 285538 | 10/1998 |
| JP | 10 285540 | 10/1998 |
| JP | 2000-173245 | 6/2000 |
| JP | 2000-30800 | 11/2000 |
| JP | 2000 348467 | 12/2000 |
| JP | 2001-143445 | 5/2001 |
| JP | 2002 507099 | 3/2002 |
| WO | WO 00 39997 | 7/2000 |
| WO | WO 00 51347 | 8/2000 |
| WO | WO 00 63914 | 10/2000 |

* cited by examiner

```
1   epl(umid, 00:00:00.00, 00:01:00.02, #1080i) {
      (1-1)  (1-2)      (1-3)       (1-4)      (1-5) (1-6)
2     source(umid, , #embedded.mpg, #1080i);
       (2-1)  (2-2)(2-3)   (2-4)        (2-5)
3     fork
      (3-1)
4       @(02:10:00.00) put(00:05.00, 00:25.00);
         (4-1)   (4-2) (4-3)  (4-4)     (4-5)
5       @(02:10:20.00) put(00:35.00, 01:00.02);
         (5-1)   (5-2) (5-3)  (5-4)     (5-5)
6       {
        (6-1)
7         source(umid, 06:54:32.10, url, #525i); //recollect
           (7-1)  (7-2)    (7-3)    (7-4) (7-5)       (7-6)
8         transform(utid, url, "upconv525to1080" #1080i);
           (8-1)   (8-2) (8-3)      (8-4)          (8-5)
9         transform(utid, url, "monochrome");
           (9-1)   (9-2) (9-3)     (9-4)
10        put(00:25.00, 00:35.00);
          (10-1)  (10-2)    (10-3)
11      }
        (11-1)
12      {
        (12-1)
13        source(umid, 00:00:00.00, url, #1080i); //title
           (13-1)  (13-2)    (13-3)   (13-4) (13-5)   (13-6)
14        fork
          (14-1)
15          put(00:00.00, 00:04.00);
            (15-1)  (15-2)    (15-3)
16          {
            (16-1)
17            transform(utid, url, "fadeout",, 1.0);
              (17-1)    (17-2)(17-3)  (17-4)  (17-5)(17-6)
18            put(00:04.00, 00:05.00);
              (18-1)  (18-2)    (18-3)
19          }
            (19-1)
20        join
          (20-1)
21      }
        (21-1)
22    join
      (22-1)
23  }
    (23-1)
```

FIG.5

```
epl(02232203_824504F1_0800468A92000201, 00:00:00.00, 00:01:00.02, #1080i) {
    source(22083102_95440497_0800468A62000232, , embedded.mpg, #1080i);
(1-2) fork                                                     (2-2)
        @(02:10:00.00) put(00:05:00, 00:25:00);
        @(02:10:20.00) put(00:35:00, 01:00.02);
        {
            source(22083102_95440497_0800468A62000232, 06:54:32.10,
    (7-4)     (7-2)  ftp://43.14.61.62/source/,#525i); //recollect
            transform(12000000000090001, ftp://43.14.61.62/exec/,
                (8-2)  "upconv525to1080",#1080i);         (8-3)
            transform(120000000001F0001, ftp://43.14.61.62/exec/,
                        "monochrome");    (9-2)       (9-3)
            put(00:25.00, 00:35.00);
        }
        {
            source(00000000_8244041D_0800468A940000522, 00:00:00.00,
    (13-2)    ftp://43.14.61.62/source/*.jpg, #1080i); //title
            fork                                       (13-2)
                put(00:00.00, 00:04.00);
                {
                    transform(1200000000080001, ftp://43.14.61.62/exec/,
                            "fadeout", , 1.0);
                    put(00:04.00, 00:05.00);
                }
            join
        }
    join
}
            format { 1001/60000,           // Capturing interval (long/long) [s]
(25-1)         - - -<中略>- - -    (25-2)                               (25-3)
                    "1080/59.94i    "      //Name of format (char)
            } 1080i;              (26-1)                  (26-2)
                  (26-3)
            format { 1001/60000,           // Capturing interval (long/long) [s]
(27-1)         - - -<中略>- - -    (27-2)                               (27-3)
                    "480/59.94i     "      //Name of format (char)
            } 525i;               (28-1)                  (28-2)
                  (28-3)
            image(3888144) embedded;
(29-1)      (29-2)   :binary data...   (29-3)
                              (29-4)
```

FIG.6

```
format {
1001/60000, // Capturing interval (long/long) [s]
0.0166, 0.0, // Shutter speed and timing (float) [s]
1001/60000, // Display interval (long/long) [s]
0.64, 0.33, // R on chromaticity (fixed)
0.3, 0.6, // G on chromaticity (fixed)
0.15, 0.06, // B on chromaticity (fixed)
0.3127, 0.329, // White on chromaticity (fixed)
0.2126, 0.7152, 0.0722, // Y Matrix coefficient (fixed)
-0.08194, -0.3854, 0.5, // Pb Matrix coefficient (fixed)
0.5, -0.4542, -0.03279, // Pr Matrix coefficient (fixed)
0, // Gamma code (char)
1, // Interlace code (char)
0, 0, 0, 0, // padding
1920*1080, // Picture size (short*short)
1920*1080, // Active size (short*short)
1888*1062, // Clean aperture (short*short)
1.0, // Pixel aspect ratio (float)
0.5, 0.5, // Luminance sampling offset (float)
1.0, 0.5, // Chrominance offset (float)
1, 1, // Luminance pitch (char)
2, 1, // Chrominance pitch (char)
10, 10, 10, 10, // Bit width Y/Pb/Pr/tl (char)
940, 64, // Y reference and offset level (short)
960, 64, // Other maximum and minimum level (short)
"1080/59.94i    " // Name of format (char)
} 1080i;
```

FIG.7

---(1) LOG EPL------------------ epl(12345608_23450467_0800468A88000021, 00:00:00.00, 00:01:03.12, #1080i) {
  source(29543202_234504C0_0800468A72000098, , file://43.14.61.62/source/, #1080i);
  fork
     @(10:00:00.12) put(00:00.00, 00:03.00); // with interviewer ← E1
     @(10:01:05.23) put(00:03.00, 00:20.13); // telling ← E2
     @(10:02:54.11) put(00:20.13, 00:40.09); // telling ← E3
     @(10:05:18.19) put(00:40.09, 00:43.10); // back of his head ← E4
     @(10:07:33.03) put(00:43.10, 01:03.12); // telling ← E5
  join
}

FIG.11

```
- - - (2-a) CUT EDIT EPL - - - - - - - - - - - - - - - - - epl(00521209_234504A3_0800468A89000128, 00:00:00.00, 00:00:45.00, #1080i) {
    source(12345608_23450467_0800468A88000021, ,
  file://43.14.61.62/source/, #1080i);
    fork
        @(00:00:00.07) put(00:00.00, 00:23.04);    ← E1'
        @(00:00:32.23) put(00:23.04, 00:28.17);    ← E2'
        @(00:00:40.09) put(00:28.17, 00:31.18);    ← E3'
        @(00:00:44.12) put(00:31.18, 00:37.29);    ← E4'
        @(00:00:52.21) put(00:37.29, 00:45.00);    ← E5'
    join
    jack(mosaic);
    jack(super);
}
```

FIG.12

```
- - - (2-b) MOSAIC EDIT EPL - - - - - - - - - - - - - - - - - epl(21341109_23450411_0800468A9B000032, 00:00:00.00, 00:01:03.12, #1080i) {
  source( (12345608_23450467_0800468A88000021), 00:00:00.00,
file://43.14.61.62/source/, #1080i);
  fork
    {
transform(12000000000C0004, ftp://43.14.61.62/exec/,
  "mosaic", , =384×232+880+128);
put(00:03.00, 00:40.09);
    }
    {
transform(12000000000C0004, ftp://43.14.61.62/exec/,
  "mosaic", , =400×256+864+96);
put(00:43.00, 01:03.12);
    }
  join
  plug(mosaic);
}
```

FIG.13

```
- - - (2-c) JAPANESE SUBTITLE EPL - - - - - - - - - - - - - - - - - epl(12221109_234504FB_0800468AC1000341, 00:00:00.00, 00:01:03.12, #1080i) {
   source( (12345608_23450467_0800468A88000021), 00:00:00.00,
file://43.14.61.62/source/, #1080i);
   fork
     {
transform(1200000000130081, ftp://43.14.61.62/exec/,
    "subtitle",, "飛行機に乗った男");
put(00:00.00, 00:10.00);
     }
     {
transform(1200000000120081, ftp://43.14.61.62/exec/,
    "translation",, "離陸したとたん、気を失った。");
put(00:01.02, 00:04.02);
     }
     {
transform(1200000000120081, ftp://43.14.61.62/exec/,
    "translation",, "目覚めたのは南の島だった。");
put(00:04.12, 00:07.29);
     }
   :
   :
     {
transform(1200000000120081, ftp://43.14.61.62/exec/,
    "translation",, "いつか夢で見たはずの景色が広がっていた。");
put(01:00.12, 01:03.12);
     }
   join
   plug(super);
}
```

FIG.14

```
- - - (2-d) ENGLISH SUBTITLE EPL - - - - - - - - - - - - - - - - - epl(23001109_234504E4_0800468AC1000288, 00:00:00.00, 00:01:03.12, #1080i) {
  source( (12345608_23450467_0800468A88000021), 00:00:00.00,
file://43.14.61.62/source/, #1080i);
  fork
    {
transform(1200000000110001, ftp://43.14.61.62/exec/,
  "subtitle", , "A man on the airplane");
put(00:00.00, 00:10.00);
    }
    {
transform(1200000000120001, ftp://43.14.61.62/exec/,
  "translation", , "The moment the plane took off, I fainted.");
put(00:01.03, 00:04.00);
    }
    {
transform(1200000000120001, ftp://43.14.61.62/exec/,
  "translation", , "I woke up to find myself on an island in the south.");
put(00:04.14, 00:07.28);
    }
    :
    :
    {
transform(1200000000120001, ftp://43.14.61.62/exec/,
  "translation", , "I saw a view spreading which I must have dreamt of before.");
put(01:00.13, 01:03.12);
    }
  join
  plug(super);
}
```

FIG.15

```
- - - (3)INTEGRATE/OPTIMIZE EPL (JAPANESE VERSION) - - - - - - - - - - - - - - - epl(09482509_234504A3_0800468A89000128, 00:00:00.00, 00:00:45.00, #1080i) {
  source(29543202_234504C0_0800468A72000098), , file://43.14.61.62/source/,
#1080i);
  fork
    @(10:00:00.19) put(00:00.00, 00:02.23);
    @(10:01:05.23) put(00:02.23, 00:20.06);
    @(10:02:54.11) put(00:20.06, 00:23.04);
    @(10:03:06.21) put(00:23.04, 00:28.17);
    @(10:05:18.19) put(00:28.17, 00:31.18);
    @(10:07:34.05) put(00:31.18, 00:37.29);
    @(10:07:42.14) put(00:37.29, 00:45.00);
  join
  fork
    {
transform(12000000000C0004, ftp://43.14.61.62/exec/,
  "mosaic", , =384×232+880+128);
put(00:02.23, 00:28.17);
    }
    {
transform(12000000000C0004, ftp://43.14.61.62/exec/,
  "mosaic", , =400×256+864+96);
put(00:31.18, 00:45.00);
    }
  join
  fork
    {
transform(1200000000130081, ftp://43.14.61.62/exec/,
  "subtitle", , "飛行機に乗った男");
put(00:00.00, 00:09.23);
    }
    :
    :
    {
transform(1200000000120081, ftp://43.14.61.62/exec/,
  "translation", , "いつか夢で見たはずの景色が広がっていた。");
put(00:42.00, 00:45.00);
    }
  join
}
```

FIG.16

```
epl(20122809_2345049B_0800468A89000124, 00:00:00.00, 00:00:45.00, #525i) {
   source(09482509_234504A3_0800468A89000128), , file://43.14.61.62/source/,
#1080i);
   transform(12000000000090002, ftp://43.14.61.62/exec/,
     "downconv1080to525", #525ii);
}
```

DEVICE FOR CREATING CONTENT FROM MULTIPLE VIDEO AND/OR AUDIO MATERIALS AND METHOD THEREFOR

TECHNICAL FIELD

The present invention generally relates to a content forming apparatus and method, an editing list making method, a content making apparatus and method, an editing apparatus and method and an editing information making apparatus and method, and more particularly to a content forming apparatus and method, an editing list making method, a content making apparatus and method, an editing apparatus and method and an editing information making apparatus and method, used for forming a content in a predetermined format from multiple video and/or audio materials.

BACKGROUND ART

The history of the moving-picture editing began with splicing cuts of a movie film to each other by the use of an adhesive. In the early video editing, editing points were marked on a video tape having a record of video data, the tape was cut at the editing points using scissors and necessary cuts thus obtained were connected to each other using an adhesive (this is called "splicing"). This splicing editing was followed by the modern electronic editing by dubbing. The dubbing editing has been lasting long.

The so-called nonlinear editing has become prevailing for these ten years. The nonlinear editing technique can be said to be a dubbing editing technique. That is, the nonlinear editing is such that while viewing images acquired from a medium, the editing person or user splices the images mainly by dubbing them, subjects them to an image processing as necessary and records an edit result into a medium, or repeats this series of editing processes. The nonlinear editing technique has been lasting for scores of years.

However, the above traditional technique is not advantageous as follows:

Firstly, the repetition of dubbing in the electronic editing causes image deterioration. This problem is unavoidable with the analog signal technology, but has been almost solved with the baseband digital technology in which a non-compressed baseband digital signal is dubbed. With the recent prevalence of the technique of image compression, however, the image deterioration has become a problem again because irreversible data compression and decompression (expansion) are repeatedly done in the image compression technique.

To solve the above problem, it is one way to use a lower ratio of compression or a shorter unit of compression. However, this solution cannot be any complete one to avoid the image deterioration because there remain many problems such as larger medium costs, longer time of communications, etc.

Even when no data compression is made, repetition of the so-called special effects such as image zooming, pixel shift, synthesis, etc. causes the problems such as image deterioration etc.

Next, the image formats such as NTSC were created and standardized with major consideration to the TV receiver, carrier frequency assignment, etc. In these days, however, it is rather common to use multiple image formats together on the windows of the HDVS and PC. Namely, it has become a large problem in collection of materials and making of a complete package to be able to support only one format.

Further, since the user can make a window of his own specification with his computer, the method of selecting a desired one of available formats cannot support the user sufficiently.

In editing, time codes are used to identify an intended picture but they can only identify positions of the picture in a roll of tape and cannot basically identify the medium itself. Identification of a medium by a reel number is also available but it is used in a local range of application. Therefore, materials have to be pooled once on hand for later use, for which large labors and costs are required.

Similarly, the special effects and title superimposing depend upon the type of the user's apparatus. Since the user's apparatus cannot process materials by any method not supported thereby, an edit result has to be recorded to a user's medium.

There will be explained hereinbelow an example of editing using a video tape recorder (VTR), in which an edit decision list (EDL) is offline-made for example for a low quality working tape prepared from a material tape, and online editing is effected based on the EDL with the use of the material tape. The EDL used herein is a program having stated therein cut-in (IN) and cut-out (OUT) points on the tapes used in a playing VTR and recorder VTR but convenient since the electronic editing is automatically completed according to the EDL.

However, since the EDL has included therein incompatible items such as special effects etc., it can only be used in limited types of systems. Also, with the EDL, much labor is required for replacement of the tape and the like. The EDL is not convenient because of many steps for correction of a complete package (video material subjected to all steps of editing and which can be broadcast as it is); for example, just insertion of one frame before a first frame needs re-editing or dubbing of the entire complete package.

As above, the current editing system has many points to solve such as efficiency, convenience, etc. and also an aspect which makes it difficult to enjoy the merit of the network. If the above disadvantage is left unconquered, the current editing system will possibly fall behind the times. Since various problems are complicatedly tied with each other, any partial countermeasure, if any, will cause a new program, the complicatedness will be further increased and the current editing system will possibly be difficult to use if any effective approach to a solution of the problems in the conventional editing system.

DISCLOSURE OF THE INVENTION

Accordingly, the present invention has an object to overcome the above-mentioned drawbacks of the prior art by providing a content forming apparatus and method, capable of executing an editing without pooling materials once on hand and with less labor and costs, namely, a content forming apparatus and method, capable of forming a content by acquiring a material based on its identification information, and having not to transmit any large volume of image data.

Also, the present invention has another object to provide a content forming apparatus and method, capable of forming a content by acquiring materials in multiple formats, including multiple video and/or audio data.

Also, the present invention has still another object to provide an edit decision list making method of making an edit decision list permitting to form a content with prevention of image deterioration, supporting multiple image data formats and with capability of switching processes from one to another.

Also, the present invention has yet another object to provide a content forming apparatus and method, capable of forming a content by playing back a final edit decision list of a hierarchical structure by the use of a distributed edit decision list made at any other distributed location and forming the content in an arbitrary format with prevention of any image deterioration, supporting multiple image data formats, having not to poll materials once on hand and with capability of switching processes from one to another.

Also the present invention has yet still another object to provide an editing unit and method, and editing information making apparatus and method, used in the above content forming, edit decision list making and content making.

The above object can be attained by providing a content forming apparatus for forming a content from multiple video and/or audio materials, the apparatus including according to the present invention:

means for making an edit decision list for the video and/or audio materials;

an edit controlling means for making an edit control signal based on the edit decision list made by the edit decision list making means; and means for forming a content in a predetermined material format from the material based on the edit control signal from the edit controlling means;

the edit decision list including identification information for identification of a material for use in editing, and a format declare statement for defining a format of at least a certain material.

In the above content forming apparatus, the content is formed to have a format declared by the format declare statement. By declaring a format by the format declare statement, it is possible to form a content in any desired format.

The identification information for the material is a globally unique identification code, and an identification code for identification of a material processing method is defined according to the identification code system. Thus, the material can be specified as a unique one by the globally unique identification code. Also, a material processing method can similarly be stated as an identification code in the edit decision list.

Also the above object can be attained by providing a content forming method of forming a content from multiple video and/or audio materials, the method including, according to the present invention, steps of:

making an edit decision list for the video and/or audio materials;

making an edit control signal based on the edit decision list made at the edit decision list making step; and forming a content in a predetermined material format from the material based on the edit control signal made at the edit controlling step;

the edit decision list including identification information for identification of a material for use in editing, and a format declare statement for defining a format of at least a certain material.

In the above content forming method, the content is formed to have a format declared by the format declare statement. By declaring a format by the format declare statement, it is possible to form a content in any desired format.

Also, the above object can be attained by providing an edit decision list making method for forming a content from multiple video and/or audio materials, the method including, according to the present invention, steps of:

defining how the editing is to be done using at least identification information form identification of an edit output and a format declare statement for identification of a format; and defining a process to be applied to an input material while defining the input material using at least identification information for identification of the input material and a format declare statement for identification of a format of the input material.

In the above edit decision list making method according to the present invention, first at least identification information for identification of an edit output and format declare statement for identification of a format are used to define how the editing is to be done, at least identification information for identification of an input material and format declare statement for identification of a format of the input material are used to define the input material and further processes to be applied to the input material.

In the above edit decision list making method, since the output identification information and input material identification information are globally unique identification codes, respectively, of the same system, the output and input material can be identified.

Also, since the processes to be applied to the input material are stated by globally unique identification codes of the same system, they can also be identified.

Also, the above object can be attained by providing a content making apparatus including according to the present invention:

means for making a final edit decision list of a hierarchical structure by integrating and optimizing distributed edit decision lists made of multiple video and/or audio materials at other distributed locations;

means for making the distributed edit decision list of materials corresponding to the edit decision list made by the edit decision list making means; and means for forming a content in an arbitrary format based on the edit decision list made by the edit decision list making means;

the edit decision list and/or distributed edit decision lists including identification information for identification of a material for use in editing and a format declare statement for defining a format of at least a certain material.

In the above content making apparatus, the distributed edit decision lists made by the distributed edit decision list making means at the other distributed locations are integrated and optimized by the edit decision list making means to make a final edit decision list of a hierarchical structure, and a content in an arbitrary format is formed by the content forming means based on the edit decision list. The edit decision list and/or distributed edit decision lists includes identification information for identification of a material used in editing and a format declare statement for defining a format of at least a certain material.

Also, the above object can be attained by providing a content making method including, according to the present invention, steps of:

making a final edit decision list of a hierarchical structure by integrating and optimizing distributed edit decision lists made of multiple video and/or audio materials at other distributed locations;

making the distributed edit decision list of materials corresponding to the edit decision list made at the edit decision list making step; and means for forming a content in an arbitrary format based on the edit decision list made at the edit decision list making step;

the edit decision list and/or distributed edit decision lists including identification information for identification of a material for use in editing and a format declare statement for defining a format of at least a certain material.

In the above content making method, the distributed edit decision lists made by the distributed edit decision list making means at the other distributed locations are integrated and optimized by the edit decision list making means to make a final edit decision list of a hierarchical structure, and a content in an arbitrary format is formed by the content forming means based on the edit decision list. The edit decision list and/or distributed edit decision lists includes identification information for identification of a material used in editing and a format declare statement for defining a format of at least a certain material.

Also, the above object can be attained by providing an editing apparatus including according to the present invention:

means for making a declare statement written by correlating identification information for identification of a source video material with a language for defining multiple editing processes to be applied to the source video materials; and means for editing the source video materials based on the declare statement.

Also, the above object can be attained by providing an editing apparatus including according to the present invention:

means for making a statement intended to specify execution of multiple editing processes to be applied to a source video material and written in a predetermined descriptive language for identification of how to process and what to be edited in the multiple editing processes; and means for editing the source video material based on the statement.

Also, the above object can be attained by providing an editing information making apparatus including according to the present invention:

means for receiving information as to multiple editing processes to be applied to a source video material; and means for making, based on the information as to the editing processes, a declare statement written by correlating identification information for identification of the source video material with a language for defining multiple editing processes to be applied to the source video material.

Also, the above object can be attained by providing an editing information making apparatus including according to the present invention:

means for receiving information as to multiple editing processes to be applied to a source video material; and means for making, based on the information as to the editing processes, a statement intended to specify execution of the multiple editing processes to be and written in a predetermined descriptive language for identification of how to process and what to be edited in the multiple editing processes.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 5 shows a detailed example of the EPL statement.

FIG. 6 provides a detailed illustration of an example of the EPL statement shown in FIG. 5.

FIG. 7 shows a concrete example of the video scan format statement.

FIG. 11 shows a logging EPL (1) made by the logging unit in the content forming system shown in FIG. 9.

FIG. 12 shows a cut editing EPL (2-a) made by the cut editing unit shown in FIG. 9.

FIG. 13 shows a mosaic editing EPL (2-b) made by the mosaic editing unit shown in FIG. 9.

FIG. 14 shows a Japanese subtitle editing EPL (2-c) made by a Japanese subtitle editing unit in the content forming system shown in FIG. 9.

FIG. 15 shows an English subtitle editing EPL (2-d) made by an English subtitle editing unit in the content forming system shown in FIG. 9.

FIG. 16 shows an EPL (3) made by the Japanese/English subtitle EPL integrating/optimizing unit by integrating and optimizing the EPLs (2-a), (2-b) and (2-c) from the editing units in the content forming system shown in FIG. 9.

FIG. 17 shows an example of the EPL integration and optimization for NTSC-oriented material conversion.

BEST MODE FOR CARRYING OUT THE INVENTION

Figure 1:
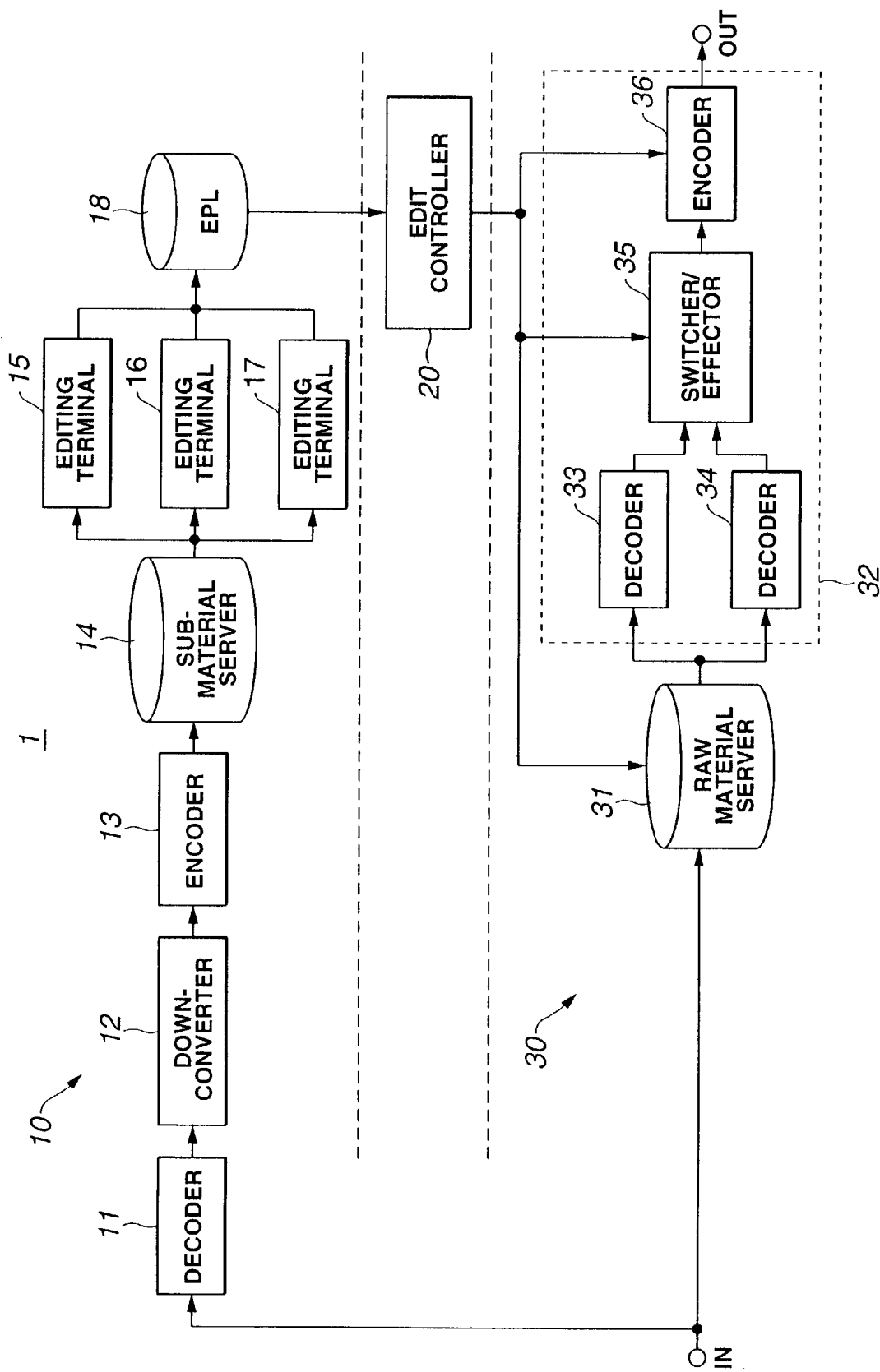
FIG. 1 is a schematic block diagram of the content forming apparatus according to the present invention.

The present invention will be described concerning the content forming apparatus and method with reference to the accompanying drawings. Referring now to FIG. 1, there is schematically illustrated in the form of a block diagram the content forming apparatus to form a content from a material including multiple video and/or audio data. The content forming apparatus is generally indicated with a reference 1. As shown, the content forming apparatus 1 includes an EPL maker 10 to produce an edit procedure list (EPL) being a kind of edit decision list (EDL), an edit controller 20 to produce an edit control signal based on the edit procedure list (will be referred to as "EPL" hereunder), and a content maker 30 to form a content in a predetermined format.

As shown, a material including multiple video and/or audio data is supplied as an input to the content forming apparatus 1. It should be noted here that the material is a one stored in a data base connected to a local area network (LAN) or a network such as the Internet, for example, for convenience of explanation. The material is supplied to the EPL maker 10 and content maker 30 via an input terminal IN.

In the EPL maker 10, a decoder 11 decodes the material, a down-converter 12 thins the decoded material, an encoder 13 compresses it by a compression method such as JPEG (Joint Photographic Experts Group), MPEG (Moving Picture Experts Group) or the like to provide highly compressed sub materials, and a sub-material server 14 stores the sub materials. The sub-material server 14 is an AV server having a disc array-structured recorder/player to sequentially take in such highly compressed sub materials, file the sub materials, and stores such a file at a specified address in the recorder/player.

Then, the highly compressed sub material in each file stored in the sub-material server 14 is supplied to each of multiple (three in this embodiment) editing terminals 15, 16 and 17 connected to the sub-material server 14, and used to make an EPL.

The editing terminals 15, 16 and 17 form together the essential part of the EPL maker 10. They read out the highly compressed sub materials from an internal recording medium and decode them, and display, on a monitor, a video reconstructed from the decoded material data. More specifically, the operator control the sub-material server 14 via any one of the editing terminals to effect a desired operation (playback, rewind or fast forward, etc.) while visually checking a video displayed on the monitor, thus making an EPL. The EPL includes identification information for identifying editing materials, and a format declare statement for defining a format of at least a certain material. It should be noted that the format declare statement specifies, in detail, a time taken for capture of one frame, shutter speed for capturing, effective pixel number, etc. The EPL including such a format declare statement will be described in detail later.

The EPL formed by each of the editing terminals 15, 16 and 17 is stored into an EPL storage unit 18. The EPL stored in this EPL storage unit 18 is read out by the edit controller 20 which will produce an edit control signal based on the EPL and supply it to the content maker 30.

The content maker 30 forms, from the material, a content in a predetermined format of the material based on the edit control signal supplied from the edit controller 20. The content maker 30 is supplied with an input material via the input terminal IN as above.

The content maker 30 stores the input material into a raw material server 31. The raw material server 31 includes a disc array-structured recorder/player and an AV server, takes in multiple video and audio data which is a specified one of supplied raw materials at the same time, file the video and audio data, and stores such a file at a specified address in the recorder/player.

The raw material server 31 reads out the raw material from each file stored in the recorder/player based on the edit control signal supplied from the edit controller 20, and supplies it to an editor 32 connected to the raw material server 31.

The editor 32 includes multiple (two in this embodiment) decoders 33 and 34, a switcher/effector 35 which is the essential part of the editor 32, and an encoder 36. The raw materials decoded by the decoders 33 and 34 are edited by the switcher/effector 35 on the basis of the edit control signal supplied from the edit controller 20, and supplied to the encoder 36. The encoder 36 encodes data having been edited in a format based on the edit control signal supplied from the edit controller 20, and then supplies it an output terminal OUT.

Supplied with two outputs, for example, of raw material from the decoders 33 and 34 at the same time, the switcher/effector 35 in the editor 32 uses the two raw material outputs to effect A/B roll edit, that is, switching and insertion using two signals or assembling on a real-time basis.

Next, the EPL (edit procedure list) created by the EPL maker 10 will be described. In the EPL, there is stated identification information for identifying editing materials. As identification information on materials, a UMID (unique material identifier) is used which is a globally unique material identification code.

A "UMID" is an identifier uniquely determined for identification of video data, audio data and other material data. The identifier consists of a globally unique identification code, and so it is called "globally unique identification information". A UMID is already defined in the SMPTE-330M standard in which a method of automatically assigning a unique ID to a material to be recorded is set forth as a standard for creation of a UMID.

Figure 2:
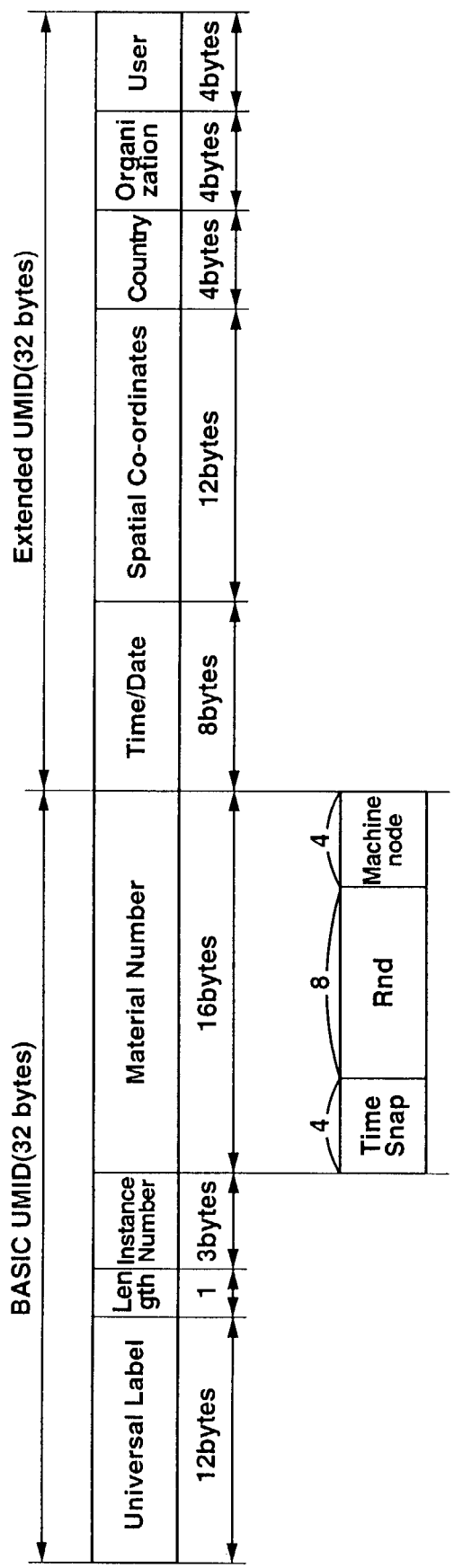
FIG. 2 schematically illustrates the data structure of a UMID being a unique identification code.

FIG. 2 shows the data structure of a UMID.

The UMID is composed of a Basic UMID as ID information for identification of material data, and an Extended UMID as a signature for identification of each of contents in material data.

The Basic UMID is composed of a 32-byte data area consisting of a 12-byte Universal Label area, 1-byte Length Value area, 3-byte Instance Number area, and a 16-byte Material Number area.

In the Universal Label area, there is stored a code to identify that a digital data string following the Universal Label area is a UMID. The Length Value area indicates the length of the UMID. Since the Basic UMID and Extended UMID are different in code length from each other, the Basic UMID is indicated with 13$h$ while the Extended UMID is indicated with 33$h$. The Instance Number area indicates whether the material data has undergone any overwrite or edit. The Material Number area has three sub-areas each having stored therein a code created by the globally used algorithm as defined in SMPTE-330M standard.

One of the sub-areas of the Material Number area is "Time Snap" of 4 bytes, indicating a number of snap clock samples a day. A time or the like at which material data has been created is indicated in clocks. The second one of the sub-areas is "Rnd (Random Number)" of 8 bytes, showing a random number intended to avoid any double numbering when any incorrect time has been set or when the network address of an apparatus defined in the IEEE (the Institute of Electrical and Electronics Engineers) has been changed for example. The third sub-area is "Machine node" as shown in FIG. 2.

On the other hand, the Extended UMID is composed of an 8-byte Time/Date Code for identification of a time and date at which the material has been created, a 12-byte Spatial Coordinates for defining a correction of the time at which the material has been created (time difference information) and positional information indicated with a latitude, longitude and altitude, a 4-byte Alphanumeric Code (Country) for defining the name of a country (as abbreviated) with characters like an alphabet and symbols, a 4-byte Alphanumeric Code (Organization) for defining the name of an organization (as abbreviated) with characters like an alphabet and symbols, and 4-byte Alphanumeric Code (used) for defining the name of a user having created the material.

Here, the EPL (Edit Procedure List) created by the EPL maker 10 will be described again.

For the EPL, there is an identification code for identifying a method of processing a material, namely, an identification code indicating an image processing method, according to the aforementioned identification code system. The identification code for identifying the material processing method is also a globally unique identification code, called "process ID" or "unique transform ID (UTID)". Operations such as fade, mix, superimpose or the like can be identified with a UTID. Meta data concerning an output is also stated in the EPL. The UTID is an ID of a result of editing by the EPL and includes a UMID as well. Further, a Time Code (TC) indicating each of edit-in and edit-out with a time, for example, is also stated in the EPL. It should be noted that the meta data is generally data management information such as attribute, semantic content, source from which the data has been acquired (data source), output destination to which the data is to be provided (data destination), etc. of data.

Further, in the EPL, there is further stated a format declare statement which defines a format of at least a certain material. The format declare statement includes an image format of an input video material and/or an image format of an edit output. Thus, a content formed by the content forming apparatus 1 will take a format declared by the format declare statement. By declaring a format by the format declare statement, a content of any format can be formed.

The minimum range of a time stated in one EPL file is a frame while the maximum range is limitless. A time is stated in an order corresponding to the order of processes such as editing, encoding, etc. and can be stated for simultaneous execution of multiple processes.

The EPL has not basically any variable. It includes only an imperative statement (process and control), but not any description for four operations of arithmetic and functional statement. Transfer of image data is not specified in the syntax of the EPL but an output of a process stated in an upper line is only entered into a process stated in a lower line.

The above EPL editing is different from the conventional one in the following respects. That is, when an EPL is completed, the editing is regarded as having been complete. The aforementioned highly compressed sub materials are often edited. A complete package (video material provided by processing subtitle characters and sounds and finished to such an extent that it can be broadcast as it is) obtained by the EPL editing is momentarily formed when it is actually used (broadcasted, for example). Basically, there exists no complete package. Also, an identification code is assigned to each of materials such as a source material, edit-result material, etc. and processes for special effects, and it is indispensably stated in the EPL. Also, an image represented by the EPL (edit-result material) is a material and can be cited from any other EPL. Further, a detailed image construction, image format and general material format are stated in the EPL. Even when any image of a desired image can be obtained, however, an alternate image, if any, may be edited by converting. For example, an image of SD (standard definition) can be edited by converting it to an image of HD (high definition).

A concrete example of EPL will be described herebelow. Prior to starting the explanation of an example of EPL statement, a concrete example of editing/edit result will be described, and then an EPL for acquisition of such an edit result be described.

Figure 3:
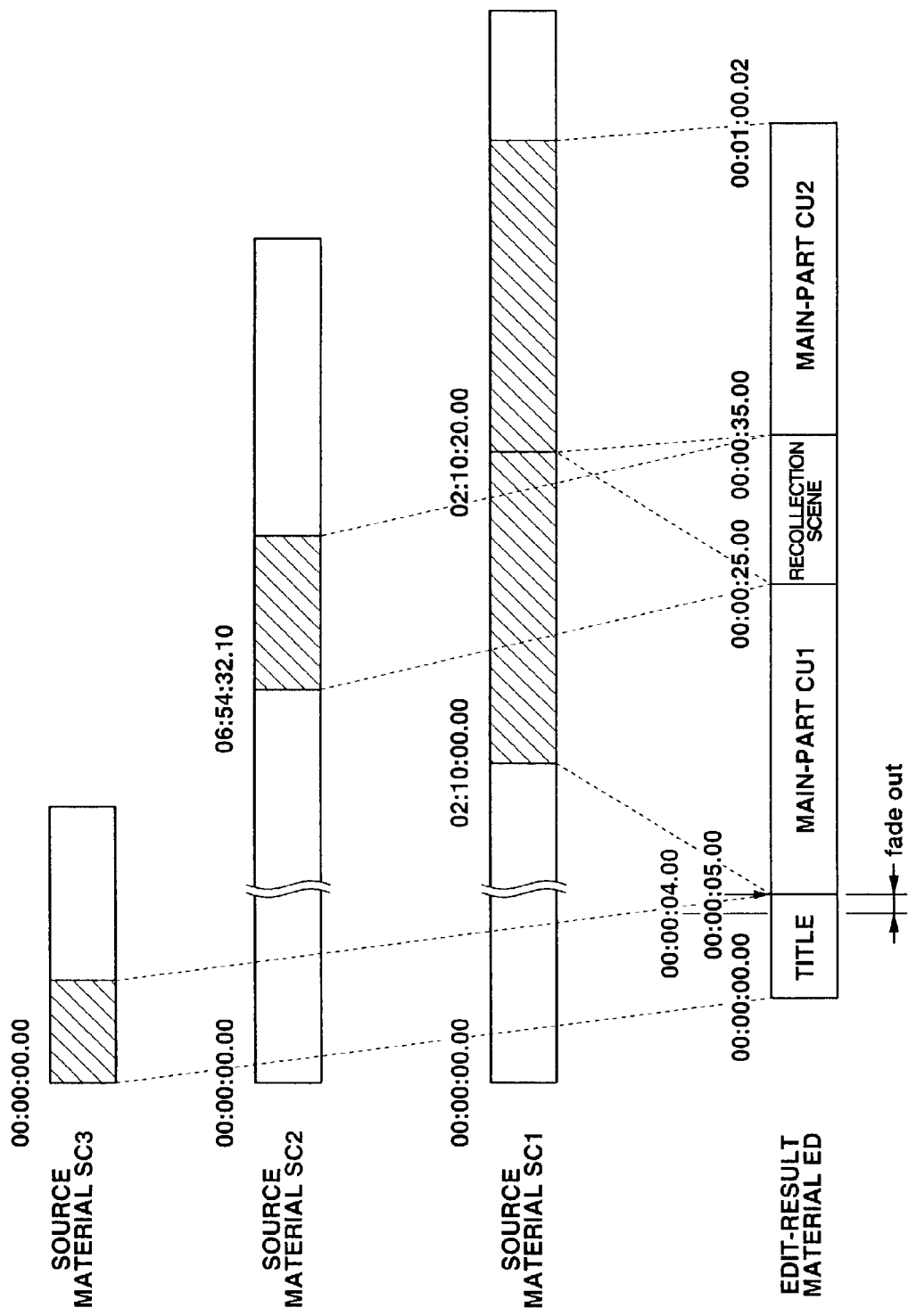
FIG. 3 schematically illustrates source materials and edit-result material in an editing using the EPL.

FIG. 3 shows forming of an edit-result material ED by editing multiple (three, for example) source materials SC1 to SC3, as a concrete example of editing/edit result. In the example shown in FIG. 3, two main-part cuts CU1 and CU2 are clipped the source material SC1, a recollection scene is clipped from the source material SC2 and inserted between the main-part cuts CU1 and CU2, and a source material SC3 is added as a title material to the top of a result of the insertion and addition to produce the edit-result material ED.

That is, as in the concrete example shown in FIG. 3, the edit-result material ED includes, starting at the top position thereof or a time code "00:00:00.00", the source material SC3 as a title material, extending to a time code "00:00:05.00", the title material being caused to fade out at a time code "00:00"04.00"; the main-part cut CU1 following the title material to be faded out and starting at a time code "02:10:00.00" being an edit cut-in (IN) of the source material SC1 to a time code "02:10:20.00"; the recollection scene extending from a time code "06:54:32.10" being an edit cut-in (IN) of the source material SC2; and the main-part cut CU2 starting at a time code "02:10:20.00" of the source material SC2 and laid between time codes "00:00:35.00" and "00:01:00.02" of the edit-result material ED, in this order. In the concrete example, the source material SC1 is an HD (high definition) video material embedded in the EPL file, for example, and the source material SC2 is an SD (standard definition) video material available from a source specified with an address or the like in an external server via a pass in the editing system or a network, for example, and which has been up-converted to an HD video data and converted to a monochromic image. That is, in the concrete example of the editing shown in FIG. 3, an external SD image (525i) is converted into a monochromic image, inserted as a recollection scene into the embedded images and a title is added to the image. During the editing, however, no edit-result material is formed but completion of an EPL is regarded as ending of the editing procedure and a video content which will be an edit-result material is formed based on the EPL.

Figure 4:
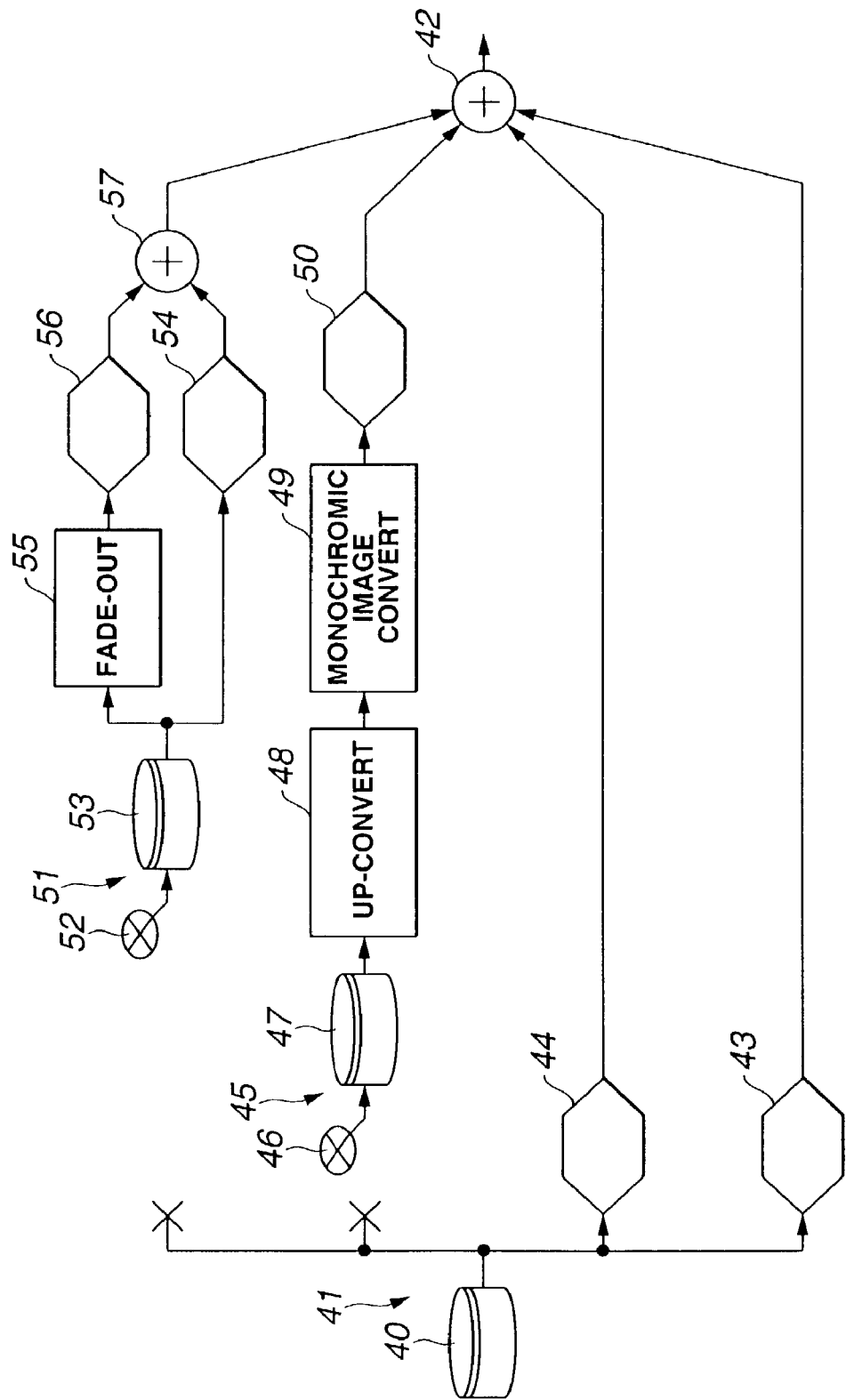
FIG. 4 shows an image of a content forming according to the descriptive content of such an EPL.

FIG. 4 shows, as an image, a content forming according to the descriptive content of such an EPL, namely, forming of the edit-result material ED shown in FIG. 3.

As shown in FIG. 4, a material storage unit 40 has the source material SC1 stored therein, and materials 43 and 44 having been clipped as the main-part cuts CU1 and CU2 out of the source material SC1 are sent to an adder 42. The source material SC2 is acquired via a network 46 and stored into a material storage unit 47. The recollection scene is read and converted by an up-conversion unit 48 into an HD (high definition) image, and by a monochromic image converter 49 into a monochromic image which is taken as a resultant material 50 to be sent to the adder 42. Also, the source material SC3 is acquired by a network 52 and stored into a material storage unit 53. A material 54 down to the portion to be faded out is sent to an adder 57. The portion to be faded out is read and undergoes a fade-out process in a fade-out processor 55 to provide a material 56 which will be sent to the adder 57. An output of the adder 57 is sent to the adder 42. When the above series of operations is done based on the EPL, the adder 42 will provide the edit-result material ED shown in FIG. 3. The edit-result material ED has not to be preformed and stored but may be formed based on the EPL when actually required (for broadcasting or the like), as having previously been described.

Next, an example statement of an EPL being a list intended to form the aforementioned edit-result material (content) will be described with reference to FIGS. 5 and 6. FIGS. 5 and 6 show the same EPL statement but FIG. 6 includes concrete examples of UMID, UTID and URL to shown the format declare statement in more detail than that in FIG. 5. Lines in FIG. 5 will be explained one by one, referring to the concrete examples in FIG. 6 as necessary and in connection with each portion of the image of the content forming in FIG. 4.

In FIG. 5, an underscored "epl" (1-1) in line 1 indicates that "epl" is followed by the unit of EPL in parentheses, and defines an output image. It indicates an image to be provided as an output. In the same line, an image ID of the image output (edit-result material ED) is stated in an underscored (1-2), and "umid" in FIG. 5 indicates that the UMID (globally unique identification code) is used as an ID for the output image. The UMID has a 32-byte data area as having been described with reference to FIG. 2. In FIG. 6, an underscored portion (1-2) indicates "02232203_824504F1_0800468A92000201" as a concrete example of the UMID. In FIG. 5, underscored portions (1-3) and (1-4) of the line 1 indicate an edit cut-in (IN) and cut-out (OUT), respectively, of an editing. In this embodiment, they indicate a time code of a starting frame and a one of an ending frame, respectively. Namely, the edit cut-in is "00:00:00.00" while the edit cut-out is "00:01:00:02" in this embodiment. An underscored portion (1-5) of the same line (line 1 in FIG. 5) indicates a scan format defining, in detail, the statement of a video signal to deal with. Namely, it is a format declare statement as having been described above. It is the video format of an edit output in this embodiment. For example, "#1080i" in FIG. 5 indicates a video format of an HD (high definition) image. The format declare statement is stated like a portion (25-1) and subsequent portions in FIG. 6, for example, which will be described in detail later. In the same line (line 1 in FIG. 5), an underscored brace "{" (1-6) is in pair with an underscored brace "}" (23-1) in line 23. An image processing is stated in a range defined between parentheses "{" and "}" according to a flow of signals. In the range defined by braces, multiple processes stated between the braces are sequentially conducted in a one-to-one input-output relation.

An underscored "source" (2-1) in line 2 in FIG. 5 indicates a source material to be edited (input material), and is followed by input material specifying information in parentheses. An image ID for the input material is stated in parentheses in an underscored portion (2-2) in the same line, and "umid" in FIG. 5 indicates that the aforementioned UMID is used as an input ID. In FIG. 6, a concrete example of the UMID is indicated as an underscored "22083102_95440497_0800468A62000232" (2-2). In an underscored portion (2-3) of the same line, there is to be stated a time code for a starting frame. In FIG. 5, however, no such a time code is stated in a corresponding underscored portion (2-3), which means that the source starts from the first frame. In an underscored portion (2-4) of the same line, there is stated a source from which the input material (source material) is acquired, namely, a location where the material is stored. In the example in FIG. 5, "#embedded. mpg" indicates that the material is embedded in the EPL file. In an underscored portion (2-5) of the same line, there is stated a scan format, a kind of format declare statement as mentioned above. In the example in FIG. 5, it is indicated that the video format of the input material is "#1080i", that is, a video format of the HD (high definition) image. Namely, an image format of the input material is identified by the format declare statement. As above mentioned, an input material (source material SC1 in FIG. 3) can be read from the material storage unit 40 (in FIG. 4) connected to the network of the editing system based on the statements in the underscored portions (2-1) to (2-5) of the line 2.

An underscored "fork" (3-1) in line 3 in FIG. 5 is in pair with an underscored "join" (22-1) in line 22 and indicates that multiple processes included in a range from "fork" to "join" are done in parallel with an input 1 and "join" means that outputs from the processes are added together. The multiple processes are ones effected within a range defined between a code 41 and adder 42 in FIG. 4, and effected in parallel with the input 1 from the material storage unit 40 and outputs from the processes are added together by the adder 42. The processes to be done are indicated in lines 4 and 5.

An underscored "@" (4-1) of line 4 indicates, by a parenthesized figure following it, indicates that a to-be-clipped portion of the input source material (source material SC1) is specified by a time code along the time axis at the input side (source material side). An edit cut-in (IN) is indicated in parentheses in an underscored portion (4-2) of the same line. In the example shown in FIG. 5, the portion to be clipped is indicated by a time code "02:10:00.00" along the time axis at the input side (source material side). An underscored "put" (4-3) in the same line indicates, in the following parentheses, a position where the portion clipped from the input material is to be pasted, by a time code along the time axis at the output side (edit-result material side). In this example, as indicated in parentheses in underscored portions (4-4) and (4-5), a portion having been clipped at a time code "00:05.00" at the output side is pasted at a time code "00:25.00". Namely, the material 43 in FIG. 4, having been clipped from a position specified with a time code "02:10:00.00" along the time axis at the input side is pasted as the main-part cut CU1 between the time codes "00:05.00" and "00:25.00".

An underscored "@" (5-1) in line 5 also indicates, by a parenthesized figure following it, indicates that a to-be-clipped portion is specified by a time code along the time axis at the input side (source material side). A time code "02:10:20.00" along the time axis at the input side is indicated in parentheses in an underscored portion (5-2) of the same line. An underscored "put" (5-3) in the same line also indicates that in parentheses, a position where the portion having been clipped from the input material is specified by a time code along the time axis at the output side. In this example, as indicated in underscored portions (5-4) and (5-5), the clipped portion is pasted at time codes "00:35.00" and "01:00.02". Namely, the material 44 in FIG. 4, having been obtained, by clipping, from a position specified by a time code along the time axis at the input side, is pasted as the main-part cut CU2 at the time codes "00:35.00" an d"01:00.02".

Next, an underscored brace "{" (6-1) in line 6 is in pair with an underscored brace "}" (11-1) in line 11, indicating that multiple processes stated within a range defined by the braces are sequentially done starting with the uppermost line in a one-to-one input-output relation. This procedure corresponds to a process 45 in FIG. 4.

Next, an underscored "source" (7-1) in line 7 indicates an input material, and is followed by input material specifying information in parentheses. An underscored "umid" (7-2) in the same line indicates the aforementioned UMID. A concrete example of "22083102_95440497_0800468A62000232" will be shown in FIG. 6. An underscored "06:54:32.10" (7-3) in the same line indicate the time code of an edit cut-in (IN). An underscored "url" (7-4) in the same line indicates, by a so-called URL (Uniform Resource Locator), a source from which a material is acquired, that is, a location where the materials is stored. As a concrete example, a URL address "ftp://43.14.61.62/source/" is shown in FIG. 6. An underscored portion (7-5) in the same line indicates a scan format, a kind of format declare statement. "#525i" in the example in FIG. 5 indicates that the input material (source material SC2 in FIG. 3) is in the video format of SD (standard definition) image. The format declare statement is stated as in an underscored portion (27-1) in FIG. 6 for example, but it will be described in detail later. According to the statements made in the underscored portions (7-1) to (7-5) in the line 7, the input material (source material SC2) whose video format is "#525i" is read via the network 46 in the process 45 in FIG. 4 and stored into the material storage unit 47 in FIG. 4. An underscored portion (7-6) in the same line indicates a comment to indicate for which scene the source material is to be used. The underscored "//recollect" in the example in FIG. 5 indicates a "recollection scene".

Next, an underscored "transform" (8-1) in line 8 indicates that an image processing stated in the following parentheses is to be done. An underscored "utid" (8-2) in the same line indicates a process ID, namely, a globally unique image transform (UTID). In FIG. 6, "12000000000090001" is indicated as a concrete example of the UTID. An underscored "url" (8-3) in the same line indicates a location from which a transform method is to be acquired, namely, a location from which a transform method specified by the above UTID is to be acquired. In FIG. 6, a URL address like "ftp://43.14.61.62/exec/" is indicated as a concrete example of the location from which the transform method is to be acquired. An underscored "upconv525 to 1080" (8-4) in the same line indicates an alias of the transform method. When the transform method cannot be acquired from the location from which it is to be acquired, a similar transform is enabled alternatively. In the example, the alias indicates an up-conversion from 525 lines to 1080 lines. An underscored "#1080i" (8-5) in the same line indicates an output video format, a kind of format declare statement. When the output image format is the same as the input video format included in the image transform, it may be omitted. The statements in the underscored portions (8-1) to (8-5) in line 8 make it possible to specify an up-conversion of an input material stored in the material storage unit 47 in FIG. 4 and whose video format is "#525i" by an up-conversion unit 48 to the video format "#1080i" in the process 45 in FIG. 4.

Next, an underscored "transform" (9-1) in line 9 indicates an image transform specified in the following parentheses. "120000000001F0001" is indicated in FIG. 6 as a concrete example of an underscored "utid" (9-2) in the same line. An underscored "url" (9-3) in the same line specifies a location where the transform method is stored (e.g., URL address). A URL address "ftp://43.14.61.62/exec/" of a location from which the transform method is to be acquired is indicated as a concrete example in FIG. 6. An underscored "monochrome" (9-4) in the same line indicates an alias, indicating a process to transform an input image (output image from the up-conversion unit 48 in FIG. 4) to a monochromic image. It should be noted that in this example, the underscored "#1080i" (8-5) in the preceding line is omitted. When the pre-conversion image is the same as the post-conversion one, the video format can be omitted. According to the statements in the underscored portions (9-1) to (9-4) in the line 9, the image having undergone the up-conversion by the up-conversion unit 48 to the video format "#1080i", as a result of the process 45 in FIG. 4, is made a monochromic image by the monochromic image converter 49.

Next, an underscored "put" (10-1) in line 10 indicates that in the following parentheses, there is specified a position wherein a monochromic image is synthesized (or inserted) along the time axis at the output side. According to underscored portions (10-2) and (10-3) of the same line, the monochromic image is laid time codes "00:25.00" and "00:35.00" along the time axis at the output side (at the side of the edit-result material ED in FIG. 3). This is the insertion of the aforementioned recollection scene.

Next, an underscored brace "{" (12-1) in line 12 is pair with an underscored brace "}" (21-1) in line 21, indicating that multiple processes stated in the braces are sequentially done in one-to-one input-output relation. This process is included in processes 51 in FIG. 4.

Next, an underscored "source" (13-1) in line 13 is to specify an input material, and a statement made in parentheses following the "source" specifies an input material. An underscored "umid" (13-2) in the same line indicates, in the parentheses, that UMID is to be used. As a concrete example, "00000000_8244041D_0800468A940000522" is shown in FIG. 6. An underscored "00:00:00.00" (13-3) in the same line indicates a time code for an edit cut-in frame (IN). An underscored "url" (13-4) in the same line indicates a source from which an image is to be acquired. A URL address like "ftp://43.14.61.62/source/*.jpg" shown in FIG. 6 is used as a concrete example. An underscored "#1080i" (13-5) in the same line specifies a video format of an input material as having been described above. With the statements made in the underscored portions (13-1) to (13-5) in the line 13, it is possible to specify one of the processes 51 in FIG. 4 to read an input material whose video format is "#1080i" via the network 52 and store it into the material storage unit 53 in FIG. 4. An underscored portion (13-6) of the same line is a comment part indicating for what scene the source is to be used. In the example in FIG. 5, the underscored portion (13-6) indicates that the source is to be used as "//title", namely, a title.

Next, an underscored "fork" (14-1) in line 14 is in pair with an underscored "join" (20-1) in line 20, indicating that multiple processes stated between the "fork" and "join" are done in parallel with an input 1. The "join" indicates that outputs are added together. This corresponds to a process, in FIG. 4, in which a material read from the material storage unit 53 is processed in 2 systems and outputs from the systems are added together by the adder 57. The processes made in the 2 systems are as follows.

First, an underscored "put" (15-1) in line 15 indicates that in the following parentheses, a position where the title material 54 read from the material storage unit 53 is to be pasted (inserted) is specified along the time axis at the output side. The parenthesized underscored portions (15-2) and (15-3) in the same line indicate the paste process between time codes "00:00.00" and "00:04.00".

Next, an underscored "{" (16-1) in line 16 is in pair with an underscored "}" (19-1) in line 19, indicating that multiple processes stated between the braces are sequentially done in a one-to-one input-output relation. This corresponds to a process for acquisition of the material 54 as in FIG. 4.

An underscored "transform" (17-1) in line 17 indicates that in the following parentheses, an image transform process is specified. An underscored "utid" (17-2) in the same line indicates that the aforementioned UTID is used as a code for identification of a process. In FIG. 6, "120000000080001" is shown as a concrete example of the UTID. An underscored "url" (17-3) in the same line is specifically "ftp://43.14.61.62/exec/" as shown in FIG. 3. An underscored "fadeout" (17-4) in the same line indicates a fade-out process. In an underscored portion (17-5) of the same line, an output video format is omitted since the output video format is similar to an input video format. An underscored "1.0" (17-6) in the same line specifies an inherent factors for which inherent settings required for the fade-out process are enumerated. According to the statements made in the underscored portions (17-1) to (17-6) of line 17, one of the processes 51 in FIG. 4 can be effected to fade out the input material whose video format is "#1080i" supplied from the material storage unit 53 by the fade-out processor 55.

Next, an underscored "put" (18-1) in line 18 indicates that in the following parentheses, a position where an output material 56 from the fade-out processor 55 in FIG. 4 is to be pasted (inserted) is specified along the time axis at the output side (edit-result material ED in FIG. 3). In the parenthesized underscored portions (18-2) and (18-3) of the same line, there is specified a process for pasting (inserting) the portion to be faded out between time codes "00:04.00" and "00:05.00" at the output side.

Then, the tile material 54 and fade-out output material 56 are added together (combined) by the adder 57 to provide a resultant output to the adder 42. As shown in FIG. 3, the adder 42 takes in the main-part cut CU1 subsequently to the title to be faded out, and then the main-part cut CU2 between the main-part cut CU1 and the monochromic recollection scene, to provide an edit-result material.

Next, the lower portion of FIG. 6 will be described. An underscored "format" (25-1) indicates a format statement, specifying the video format in detail in the following parentheses. An underscored "1001/60000" (25-2) and underscored "1080/59.94i" (26-1) indicate actual values of items and parameters included in the video format specification, and underscored "Capturing interval (long/long) [s]" (25-3) and "//Name of format (char)" (26-2) indicate item names in the specification as a comment.

Also, an underscored "format" (27-1) indicates a format statement, specifying the image format in detail in the following parentheses. An underscored "1001/60000" (27-2), "480/59.94i" (28-1), etc. indicate actual values of items and parameters included in the image format specification, and underscored "Capturing interval (long/long) [s]" (27-3), "//Name of format (char)" (28-2), etc. indicate item names in the specification as a comment, as in the above.

In the EPL shown in FIG. 6, an underscored "image" (29-1) specifies an embedded image data in detail. A parenthesized underscored portion (29-2) indicates a number of bytes in a binary part. The number of bytes is (bit+7)*8/8 in this example. An underscored portion (29-3) indicates the name of the image data in the file, and the name is "embedded" in this example. An underscored "binary data . . ." (29-4) specifies a data body.

The concrete example of EPL has been described in the foregoing.

Normally, an EPL is processed as a string of characters by an interpreter. Also, data in the EPL are edited as a string of characters. When the data are compiled, the EPL will be a unique code for a compilation apparatus, and so it will not be defined in a data format for the apparatus. To compress data for storage or the like, a lossless compression (such as Huffman code of zip, LHA, etc.) is used.

Also, a UMID is an identification code defined in the aforementioned SMPTE330M. As a UMID of EPL in this embodiment, 32 bytes of the aforementioned Basic UMID can be used for example. However, only 16 bytes of a material number with a universal label, instance, etc. omitted may be used as the UMID of EPL. An output image is created as a result of editing, but image data having been resulted from creation of an EPL is regarded as a material and added to the output image.

Data can be notated in hex (hexadecimal), and arbitrarily underscored (underscore '_') to be highly visible. Parenthesized data indicates a processed image, not any material itself. A source from which data is to be acquired (source or argument of transform) identifies a location of the data with a top one of characters in a string. When a UMID is pre-registered in a data base, no data source may be stated.

A time code TC is stated in a common form of hours:minutes:seconds.Frame, and unnecessary upper digits can be omitted. At the input side, there is stated solely a time code for an edit cut-in (IN) while at the output side, there are stated time codes (TC) for both edit cut-in (IN) and cut-out (OUT). At the output side, "put( )" is used to state an insertion position, but if the "put( )" is omitted, the time code will apply to a whole content specified by "epl( )".

Using an argument in "source( )" or "@( )", there is stated at the input side a source from which data is to be clipped. For a cut editing, it is of course necessary to state time codes (TC) for both edit cut-in (IN) and cut-out (OUT). Time codes (TC) at the input side may be omitted when they have not to be specified, namely, for effects for example.

Image data transferred from an upper line to a lower line is R/G/B/tl or Y/Pb/Pr/tl. In case the chrominance of Y range is 4:2:2, for example, Y, tl, Pb, Pr, Y and tl are repeated from a left upper pixel. Also, an image data is passed through a narrower path than a total bit width specified with "format{ }", it is plugged in on an LSB first basis.

A "tl" ("translucence") is also called "α value" in the fields of image synthesis and computer graphics. In each Y range, a normal image has a value of 0 (opaque). The translucence (tl) is used only in the middle of a process, but not included in any normal "epl( )" execution output signal.

The data format of an input image is identified by a file extension. However, the file extension may be omitted. For example, "epi" stands for EPL file. Also, "eiv" stands for EPLL intermediate video. "ybr" stands for Y/Pb/Pr. "rgb" stands for Red/Green/Blue. "jpg" stands for JPEG wp. Also, "mpg" stands for "MPEG1".

As above, there are available various data formats for an input image. Of them, however, the above mentioned ones and all MPEG2 profiles are normally supported in the present invention. For any compression other than the standard one, "transform( )" is stated just after "source( )" to specify an expansion.

The above "eiv" is a non-compressed data including up to a translucence (tl) (or α value) with "format{ } header". The "eiv" will occur if "plug( )" is executed while not being canceled by optimization. Normally, the "eiv" is managed according to the UMID, and no file name is stated in the EPL. Therefore, "wild card '*'" is used to state an extension.

Note that since an output image is supplied solely to a monitor or broadcasting encoder, only "non-compress" is stated. However, it can be defined by stating "transform( )" in the last line of "epl( )" whether an intended process is "compress" or "non-compress".

Next, a video scan format to be stated in EPL will be described.

With the capability and versatility taken in consideration, the details of the specification will be explained fully. Namely, "NTSC" will be stated along with "720×480", "60/1.001", "colorimetry", . . . .

Concerning the capability, however, the concepts of the pixel and frame are strictly held solely in a range of the raster scanning. That is, the video format included in the present invention is a generalized representation of a raster video format.

For stating the raster video format as a "format{ }" statement in EPL, it is stated with an ASCII character string as will be seen from the following example. For including it in a video signal, a specified data type of "binary 128 bytes" is put at each clip.

| | | |
|---|---|---|
| Capturing interval | Time for capture of one frame | long/long [s] |
| Shutter speed | Shutter speed for capturing | float [s] |
| Shutter timing | Time when shutter is opened | float [s] |
| Display interval | Time for display of one frame | long/long [s] |
| RGB on chromaticity | Coordinates of primary colors and while on chromaticity chart | fixed × 2 × 4 |
| Matrix coefficients | Matrix for conversion to Y/Pb/Pr | fixed × 9 |
| Gamma code | Code for gamma conversion | char |
| Interlace code | Code for interlacing | char |

-continued

| | | |
|---|---|---|
| Padding | Adjustment of byte number | char × 4 |
| Picture size | Numbers of effective pixels, vertical and horizontal | short*short |
| Active size | Range except for solid area | short*short |
| Clean aperture | Range in which image quality is warranted | short*short |
| Pixel aspect ratio | Aspect ratio of each pixel | float |
| Luminance offset | Position at which luminance process is stared | float × 2 |
| Chrominance offset | Position at which chrominance process is started | float × 2 |
| Luminance pitch | Thinning of luminance pixel | char × 2 |
| Chrominance pitch | Thinning of chrominance pixel | char × 2 |
| Bit switch | Data bit width of Y/Pb/Pr/tl | char × 4 |
| Y range | White of 100% luminance and black of 0% luminance | short × 2 |
| Other range | Maximum and minimum values of other than luminance | short × 2 |
| Name of format | Alias of format | char × 16 | where "long", "short" and "char" are unassigned integers of 4, 2 and 1 bytes, respectively. "fixed" is a fixed point of 2 bytes and "0x7fff" is regarded as "1". 0x0001 approximates 0.00003. Also, "float" is solely of a positive value for all items but it is a normal IBM floating point of 4 bytes.

The translucence (tl) is used only in the middle of a process, and not included in any normal "epl( )" execution output signal. A gamma code may be represented by a coefficient (0.018, 4.5, 1.099, 0.45, 0.099) similarly to the other items, but it is actually used in a conversion table. A chrominance may be either 2's complement or offset binary and it is represented by a magnitude of its range.

FIG. 7 shows a concrete example of the video scan format statement concerning (1080/59.95i). Various items in the detailed specification in FIG. 7 are as have been described above.

As having been described in the foregoing, in the content forming apparatus 1 shown in FIG. 1, a UMID (unique material identifier) for identification of an editing material and output, a UTID for identification of a processing method, and also a scan format for identification of the format of an input material and output, are stated in an EPL. Thus, since a material can be acquired based on its ID in forming a content, it is possible during editing not to transmit any large volume of image data at a high rate. Also, by acquiring a material when it becomes necessary to actually form a content as an edit result for broadcasting or the like, copyright protection and billing can be made. Since a processing method can be cited based on its ID, any editing environment (abilities and functions of the equipment) will do. Also, copyright protection and billing can be made for the processing method itself. Also, any input material can freely be selected. Also, outputs in multiple formats can be acquired simultaneously. Also, since an EPL is made at a low level of image quality, it can be made in any place and environment.

Since the EPL maker 10 inside the content forming apparatus 1 makes an EPL by the edit decision listing method having been described concerning the embodiment of the present invention, an edit decision list for forming a content is made with prevention of image data degradation, supporting multiple image data formats, having not to pool any material once on hand and with capability of switching processes from one to another.

Next, there will be described a content forming system in which multiple groups distributed at several locations share the work of making an EPL to edit a content. Since any material is not directly processed in the edit procedure using the EPL, the multiple groups distributed at several locations can share the work of editing a content.

Figure 8:
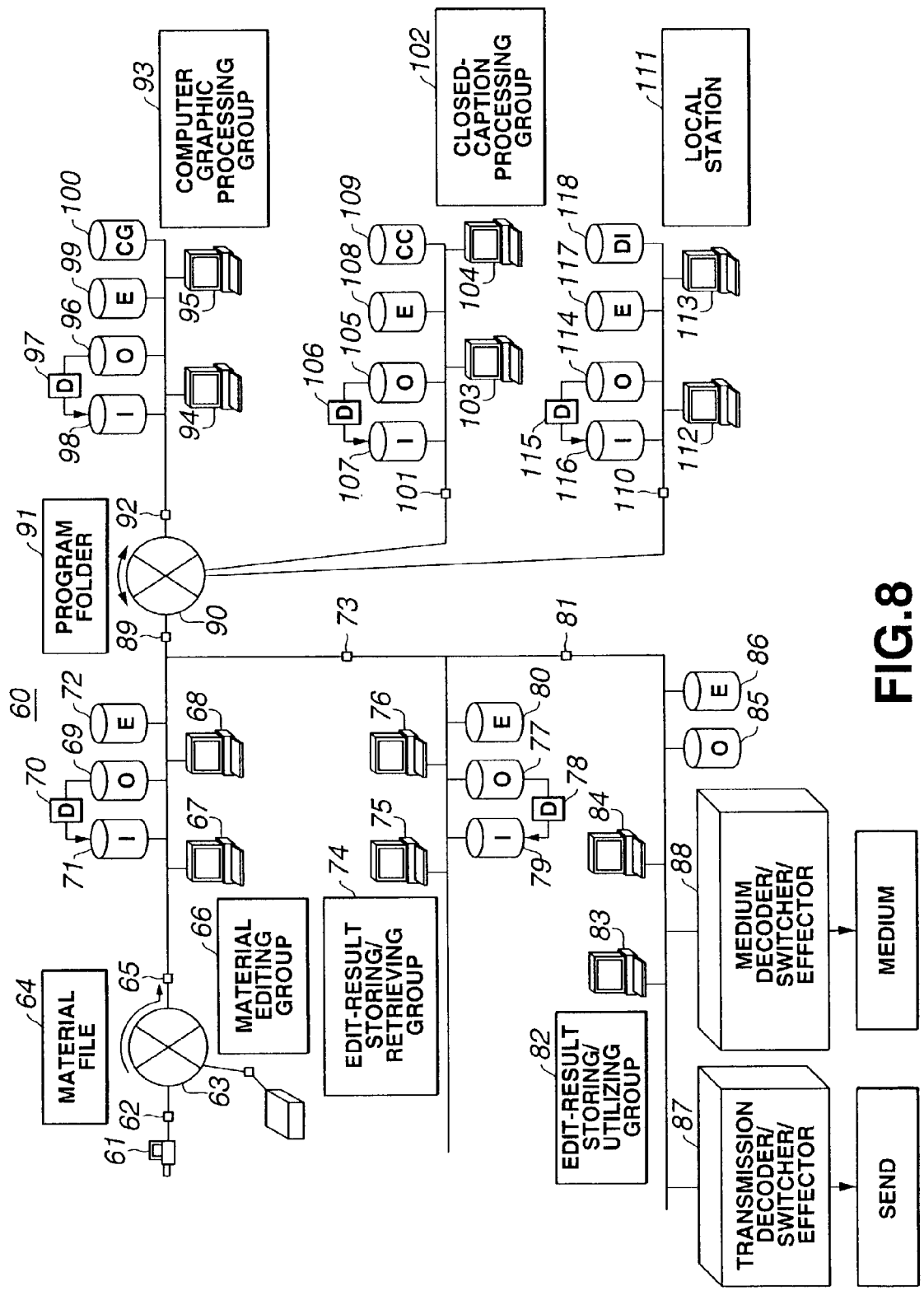
FIG. 8 schematically illustrates the general construction of the content forming system according to the present invention.

FIG. 8 is a general block diagram of a content forming system. The content forming system is generally indicated with a reference 60. In the content forming system 60, each of a material editing group 66, edit-result storing/retrieving group 74 and an edit-result utilizing group 82 has a LAN (local area network), and the LANs are connected to each other to form a first editing group. Also, each of a computer graphic processing group 93, closed-caption processing group 102 and local station 111 has a LAN, and the LANs are connected to each other to form a second editing group.

In the above content forming system 60, a material file 64 including video and/or audio data picked up by a video camera 61 is supplied to the material editing group 66 in the first editing group via an external network 63 such as the Internet.

First, the material editing group 66 included in the first editing group will be described. The material editing group 66 is provided inside gates 65, 89 and 73, and includes two computer terminals 67 and 68, material server (O) 69, decoder/encoder (D) 70, online editing intra-frame server (I) 71, and an EPL server (E) 72. The intra-frame server (I) 71 corresponds to the sub-material server 14 in FIG. 1, and can acquire each frame image without reference to any other frame.

Using the computer terminal 67 or 68, the operator of the material editing group 66 downloads the material file 64 from a storage location or video camera 61 via the external network 63 and stores it into the material server 69 and intra-frame server 71.

The material file 61 is stored as the highly compressed sub material into the intra-frame server 71 as having previously been described. More specifically, a material stored in the material file 64 is sent to the decoder/encoder 70 where it will be decoded. The decoded material is then thinned, and undergoes an encoding (intra-frame compression) to provide a highly compressed sub material. The sub material is stored into the intra-frame server 71. These components of the content forming system 60 corresponds to the decoder 11, downconverter 12, encoder 13 and sub-material server 14 in FIG. 1.

Each of the above two computer terminals 67 and 68 also function as an editing terminal shown in FIG. 1. Namely, it reads out the sub material from the intra-frame server 71, decodes it and displays, on a monitor, a video based on the decoded data. At this time, the operator operates the computer terminal to make an EPL while controlling the intra-frame server 71 to make a desired operation (play, rewind or fast forward) and visually checking the video displayed on the monitor. The EPL includes identification information for identifying an editing materials and outputs as above and a format specification for defining a format of at least a certain material.

The EPL thus made is stored into the EPL server 72. The Epl stored in the EPL server 72 is read out by each of the groups includes in the first and second editing groups to share the work of editing a content. It should be noted that the EPL server 72 generally corresponds to the EPL storage unit 18 in FIG. 1.

Next, the edit-result storing/retrieving group 74 will be described. The edit-result storing/retrieving group 74 is provided inside the gates 73 and 81, and includes two computer terminals 75 and 76, material server (O) 77, decoder/encoder (D) 78, offline editing intra-frame server (I) 79, and an EPL server (E) 80 as shown in FIG. 8.

The edit-result storing/retrieving group 74 takes out the EPL from the EPL server 72 and stores it into the EPL server 80 to form a provisional content by effecting an editing based on the stored EPL and store the provisional content. Thus, the content forming system 60 is designed to store a necessary edit-result as a material. Also, it can retrieve the EPL and edit-result.

Next, the edit-result utilizing group 82 will be described. The edit-result utilizing group 82 is provided between the gate 81 and transmission side, and includes two computer terminals 83 and 84, material server (O) 85, EPL server (E) 86, transmission decoder/switcher/effector 87, and a medium decoder/switcher/effector 88 as shown in FIG. 8.

The edit-result utilizing group 82 takes out the EPL from the EPL server 72, and stores it into the EPL server 86. Using the computer terminals 83 and 84 corresponding to the edit controller 20 in FIG. 1, the operator forms a content based on the stored EPL by the use of materials stored in the material server 85. The edit-result utilizing group 82 sends the content from the transmission decoder/switcher/effector 87 and medium decoder/switcher/effector 88, corresponding to the edit execution unit 32 in FIG. 1, and works as a medium to distribute the content.

The second editing group will be described. The second editing group is connected to the first editing group via an external network 90 connected to the gates 89 and 92. An EPL can be transmitted and received in the form of a program folder 91 bidirectionally, namely, between the first and second editing groups.

The computer graphic processing group 93, closed-caption processing group 102 and local station 111 included in the second editing group form together a group to share the work of making an EPL.

The description of the second editing group will begin with the computer graphic processing group 93. As shown, the computer graphic processing group 93 includes two computer terminals 94 and 95, material server (O) 96, decoder/encoder (D) 97, offline editing intra-frame server (I) 98, EPL server (E) 99, and a computer graphic server (CG) 100 as shown in FIG. 8. The intra-frame server 98 corresponds to the sub-material server 14 in FIG. 1.

The operator of the computer graphic processing group 93 downloads an EPL in the form of a program folder from the EPL server 72 in the material editing group 66, and stores it into the EPL server 99. A material used in the compute graphic processing is stored as a highly compressed material by the decoder/encoder 97 into the intra-frame server 98. Operating the computer terminal 94 or 95, the operator controls the computer graphic server (CG) 100 to make an EPL by making CG (computer graphics) processing of a sub material read out from the intra-frame server 98 while viewing it on the monitor. The EPL thus made is stored into the EPL server 99 and sent in the form of a program folder to the EPL server 72 of the material editing group 66.

Next, the closed-caption processing group 102 will be explained. As shown in FIG. 8, the closed-caption processing group 102 includes two computer terminals 103 and 104, material server (O) 105, decoder/encoder (D) 106, offline editing intra-frame server (I) 107, EPL server (E) 108 and a closed-caption server (CC) 109.

The operator of the closed-caption processing group 102 uses the computer terminal 103 or 104 to download an EPL in the form of a program folder from the EPL server 72 of the material editing group 66, and stores it into the EPL server 108. A material used in the closed-caption processing is stored as a highly compressed material by the decoder/encoder 105 into the intra-frame server 107. Operating the computer terminal 103 or 104, the operator controls the closed-caption server (CC) 109 to make an EPL by making CC processing of a sub material read out from the intra-frame server 107 and viewing it on the monitor. The EPL thus made is stored into the EPL server 108 while being sent in the form of a program folder to the EPL server 72 in the material editing group 66.

Next, the local station 111 will be explained. As shown, the local station 111 includes two computer terminals 112 and 113, material server (O) 114, decoder/encoder (D) 115, offline editing intra-frame server (I) 116, EPL server (E) 117 and a district-unique information (DI) server 118.

The operator of the local station 111 downloads an EPL in the form of a program folder from the EPL server 72 of the material editing group 66, and stores it into the EPL server 117. A material used in editing in the local station is stored as a highly compressed material by the decoder/encoder 115 into the intra-frame server 116. Operating the computer terminal 112 or 113, the operator uses the district-unique information (DI) server 118 to make an EPL while making unique editing of a sub material read from the intra-frame server 116 and viewing it on the monitor. The EPL thus made is stored into the EPL server 108 while being sent in the form of a program folder to the EPL server 72 of the material editing group 66.

Then, finally in the material editing group 66, various EPLs in the EPL server 72 are managed to integrate and optimize the EPLs. In the edit-result storing/retrieving group 74 and edit-result utilizing group 82, an integrated and optimized EPL is used by the material editing group 66.

As having been described in the foregoing, in the content forming apparatus 60 shown in FIG. 8, a UMID (unique material identifier) for identification of an editing material and output image, a UTID for identification of a processing method, and also a scan format for identification of the format of an input material and output image, are stated in an EPL. Thus, since a material can be acquired based on its ID in forming a content, it is possible during editing not to transmit any large volume of image data at a high rate. Also, by acquiring a material when it becomes necessary to actually form a content as an edit result for broadcasting or the like, copyright protection and billing can be made. Since a processing method can be cited based on its ID, any editing environment (abilities and functions of the equipment) will do. Also, copyright protection and billing can be made for the processing method itself. Also, any input material can freely be selected. Also, outputs in multiple formats can be acquired simultaneously. Also, since an EPL is made at a low level of image quality, it can be made in any place and environment. Also, since any material is not directly processed in the edit procedure, the multiple groups distributed at different locations can make their jobs simultaneously in editing a content.

Next, a concrete example of EPL editing will be described with reference to FIGS. 9 to 16. In this example, after an EPL (1) is made by logging an interview-record raw material, cut editing EPL (2-a), mosaic editing EPL (2-b), Japanese subtitle EPL (2-c) and an English subtitle EPL (2-d) are made in parallel. Finally, the EPLs are integrated and optimized to make an EPL (3), and a content is formed as an edit-result material. It should be noted that in this example, "format{ }" and individual processes similar in statement to each other are omitted.

Figure 9:
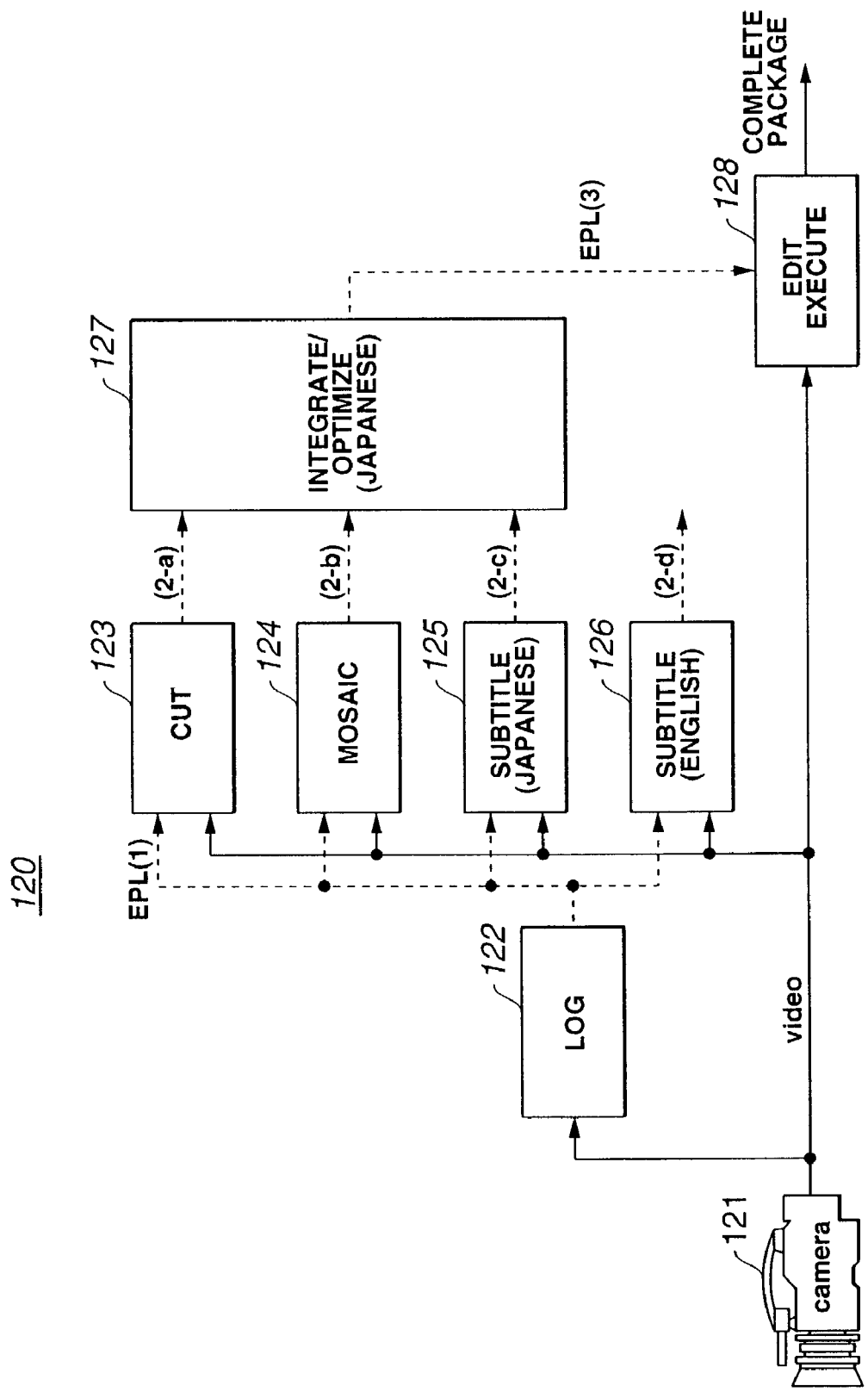
FIG. 9 is a functional block diagram of a content forming system in which an EPL is made by multiple editing units sharing the work of editing.

FIG. 9 is a functional block diagram of a content forming system 120 in which an EPL is made by multiple editing units sharing the work of editing. A material including video and/or audio data captured by a video camera 121 is logged by a logging unit 122 to make an EPL (1). The EPL (1) is used simultaneously by a cutting editing unit 123, mosaic editing unit 124, Japanese subtitle editing unit 125 and an English subtitle editing unit 126 to make the cut editing EPL (2-a), mosaic editing EPL (2-b), Japanese subtitle editing EPL (2-c) and English subtitle editing EPL (2-d), respectively. Of course, each of the logging unit 122, cutting editing unit 123, mosaic editing unit 124, Japanese subtitle editing unit 125 and English subtitle editing unit 126 has a similar construction and function to those of the EPL maker 10 in FIG. 1.

There is also provided a Japanese/English subtitle EPL integrating/optimizing unit 127 to integrate and optimize the EPLs (2-a), (2-b), (2-c) and (2-d) from the editing units to produce an EPL (3). The Japanese/English subtitle EPL integrating/optimizing unit 127 functions like the edit controller 20 in FIG. 1. The EPL (3) is sent to an edit execution unit 128 which will actually edit the materials.

The edit execution unit 128 has a similar construction and function to those of the content maker 30 in FIG. 1. Since it has stored in an internal server thereof materials supplied from the video camera 121, it can edit them using the EPL (3) from the subtitle EPL integrating/optimizing unit 127.

The "integration/optimization" means to integrate and optimize a declare statement, define statement and control statement written in the EPL and related with editing. More specifically, it means to integrate and optimize edit points and sections and image processing processes intended for editing.

Figure 10:
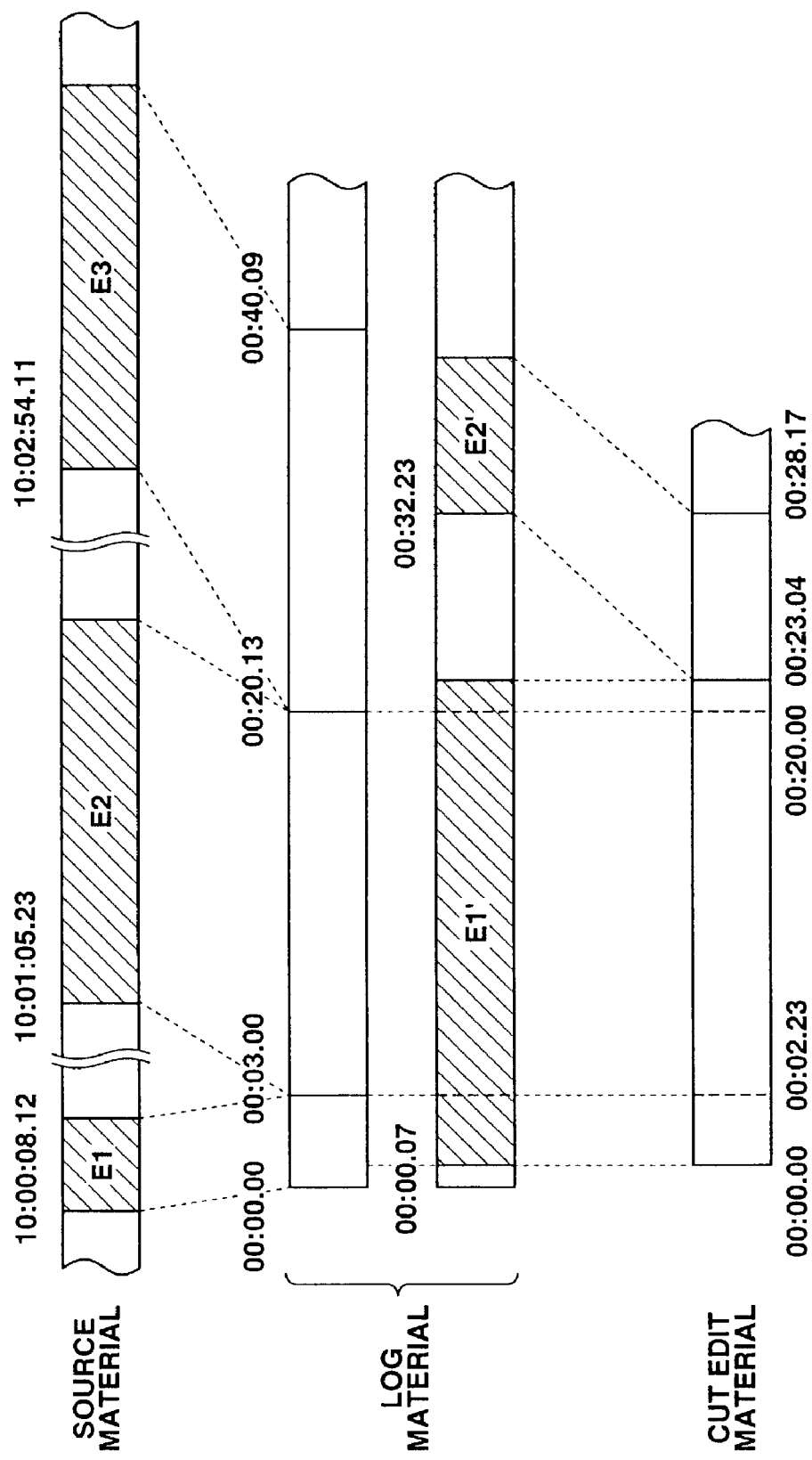
FIG. 10 illustrates a part of the process for integrating and optimizing the statements in the EPL, showing an example of integrating and optimizing logging EPL and cut editing EPL.

FIG. 10 illustrates a part of the process for integrating and optimizing the statements in the EPL shown in FIGS. 11 to 15 to make an EPL shown in FIG. 16. More specifically, FIG. 10 shows an example of integrating and optimizing logging EPL in FIG. 11 and cut editing EPL in FIG. 12. In the example shown in FIG. 10, provisional-editing joints are kept as they are, not re-joined by a regular editing, and thus many edit points are found due to the integration of the EPLs. The integration and optimization shown in FIG. 10 will be described in detail later following the description made with reference to FIGS. 11 to 16.

FIG. 11 shows a logging EPL (1) made by the logging unit 122. In FIG. 11, "12345608_23450467_0800468A88000021" following "epl (" in line 1 states an identification code for identification of an output (log-result material). Edit cut-in (IN) and cut-out (OUT) are stated by a time code of a starting frame and a one of an ending frame. In this example, the edit cut-in is "00:00:00.00" and the edit cut-out is "00:01:03.12". A video format of this output can be specified by a statement "#1080i".

Next, it is stated that an input material is identified by UMID "29543202_234504C0_0800468A72000098" and an input material whose video format is "#1080i" is read out from a storage location "file://43.14.61.62/source/".

Next, a pair of "fork" and "join" indicates that one input 1 undergoes 5 parallel processes and outputs, namely, results of the processes, are added together. The first process is such that a material acquired from telling with an interviewer, starting at a time code "10:00:00.12" along the time axis at the input side (source material side) is pasted (inserted) between time codes "00:00.00" and "00:03.00" along the time axis at the output side (log-result material side). The second process is such that a material acquired during telling, starting at a time code "10:01:05.23" along the time axis at the input side is inserted between time codes "00:03.00" and "00:20.13" along the time axis at the output side. The third process is such that a material acquired during telling, starting at a time code "10:02:54.11" along the time axis at the input side is inserted between time codes "00:20.13" and "00:40.09" along the time axis at the output side. The fourth process is such that a background image beyond the head of a talker, starting at a time code "10:05:18.19" along the time axis at the input side is inserted between time codes "00:40.09" and "00:43.10" along the time axis at the output side. The fifth process is such that a material acquired during telling, starting at a time code "10:07:33.03" along the time axis at the input side is inserted between time codes "00:43.10" and "01:03.12" along the time axis at the output side.

FIG. 12 shows a cut editing EPL (2-a) made by the cut editing unit 123. In the EPL (2-a), UMID "00521209_234504A3_0800468A89000128" is taken as a code for identification of an output (edit-result material), and edit cut-in (IN) and cut-out (OUT) are "00:00:00.00" and "00:00:45.00", respectively. Also, a video format of an output can be specified by a statement "#1080i".

Next, it is stated that an input material whose video format is "#1080i", specified by UMID "12345608_23450467_0800468A88000021", is taken out from a storage location "file://43.14.61.62/source/".

The above input material is used to do the above five cut editing processes. The first process is such that a material at a time code "00:00:00.07" along the time axis at the input side is inserted between time codes "00:00.00" and "00:23.04" along the time axis at the output side. The second process is such that a material at a time code "00:00:32.23" along the time axis at the input side is inserted between time codes :00:23.04" and "00:28.17" along the time axis at the output side. The third process is such that a material at a time code "00:00:40.09" along the time axis at the input side is inserted between time codes "00:28.17" and "00:31.18" along the time axis at the output side. The fourth process is such that a material at a time code "00:00:44.12" along the time axis at the input side is inserted between time codes "00:31.18" and "00:37.29" along the time axis at the output side. The fifth process is such that a material at a time code "00:00:52.21" along the time axis at the input side is inserted between time codes "00:37.29" and "00:45.00" along the time axis at the output side. The results of these five processes are added together.

Statements between "fork" and "join" enclosing the above five processes are followed by statements "jack (mosaic)" and "jack (super)". The "jack" indicates a position where data is received from "child EPL" at the time of an optimization by the subtitle EPL integrating/optimizing unit 127. The "(mosaic)" and "(super)" are provisional IDs arbitrarily given by the user. In this example, the "(mosaic)" is used since it indicates a position where an EPL made by the mosaic editing by the mosaic editing unit 124 is received. Also, the "(super)" is used since it indicates a position where an EPL made by the Japanese subtitle editing by the Japanese subtitle editing unit 125 is received. After the optimization, the statements "jack (mosaic)" and "jack (super)" will disappear.

FIG. 13 shows a mosaic editing EPL (2-b) made by the mosaic editing unit 124. In the EPL (2-b), UMID "21341109_23450411_0800468A9B000032" specifies an output and edit cut-in (IN) and cut-out (OUT) are "00:00:00.00" and "00:01:03.12". Also, a video format of an output can be specified by a statement "#1080i".

Next, UMID "12345608_23450467_0800468A88000021" is a statement that an input material whose video format is "#1080i" is taken output from a storage location "file://43.14.61.62/source/".

Then, the input material is used to do the following two mosaic editing processes. The first mosaic editing process is such that an image processing method specified by a process ID (UTID) "12000000000C0004" stored in a storage location "ftp://43.14.61.62/exec/" is done with a similar video format "#1080i" to that of the input material and a setting "=384× 232+880+128". The result of this mosaic editing is inserted between an edit cut-in "00:03.00" and cut-out "00:40.09". The second mosaic editing process is such that an image processing method specified by a process ID (UTID) "12000000000C0004" stored in a storage location "ftp://43.14.61.62/exec/" is done with a similar video format "#1080i" to that of the input material and a setting "=400× 256+864+96". The result of this mosaic editing is inserted between an edit cut-in "00:43.00" and cut-out "01:03.12". The results of these two mosaic editing processes are added together.

Statements between "fork" and "join" enclosing the above two processes are followed by a statement "plug (mosaic)". The "plug" indicates a position where data is transferred to "parent EPL" at the time of an optimization by the subtitle EPL integrating/optimizing unit 127. The "mosaic" is a provisional ID arbitrarily given by the user. The statement "plug (mosaic)" will disappear after the optimization.

FIG. 14 shows a Japanese subtitle editing EPL (2-c) made by the Japanese subtitle editing unit 125. In the EPL (2-c), UMID "12221109_234504FB_0800468AC1000341" specifies an output identification code and edit cut-in (IN) and cut-out (OUT) are "00:00:00.00" and "00:01:03.12". Also, a video format of an output can be specified by a statement "#1080i".

Next, UMID "12345608_23450467_0800468A88000021" states that an input material whose video format is "#1080i" is taken output from a storage location "file://43.14.61.62/source/".

Then, the input material is used to do the following editing processes. First, a processing method specified by a process ID (UTID) "1200000000130081" stored in a storage location "ftp://43.14.61.62/exec/" is done with a similar video format "#1080i" to that of the input material to make a subtitle "A man on the airplane". The result of this subtitle editing is inserted between an edit cut-in "00:00.00" and cut-out "00:10.00". Next, a process ID (UTID) "1200000000120081" stored in a storage location "ftp://43.14.61.62/exec/" is done with a similar video format "#1080i" to that of the input material to make a subtitle "The moment the plane took off, I fainted." The result of this subtitle editing is superimposed (inserted) between an edit cut-in "00:01.00" and cut-out "00:04.02" Then, the same processing method stored in the same storage location is done with the same video format to make a subtitle "I woke up to find myself on an island in the south". This subtitle is superimposed (inserted) between edit cut-in "00:04.12" and cut-out "00:07.29". Further, some Japanese subtitles are inserted into an image. Finally, the same processing method stored in the same storage location is done with the same video format to make a subtitle "I saw a view spreading which I mut have dreamed of before", and this subtitle is superimposed between edit cut-in "01:00.12" and "01:03.12". The results of these editing processes are added together.

Statements between "fork" and "join" enclosing the above processes are followed by a statement "plug (super)". The "plug (super)" indicates a position where data is transferred to "parent EPL" at the time of an optimization by the subtitle EPL integrating/optimizing unit 127 as mentioned above.

FIG. 15 shows an English subtitle editing EPL (2-d) made by the English subtitle editing unit 126. This EPL is an English version of the Japanese subtitle editing EPL having been described with reference to FIG. 14. The EPLs (2-d) and (2-c) are similar to each other except for the subtitles and translating process ID. So, the EPL (2-d) will not be described any further.

FIG. 16 shows an EPL (3) made by the Japanese/English subtitle EPL integrating/optimizing unit 127 by integrating and optimizing the EPLs (2-a), (2-b) and (2-c) from the editing units. Namely, the EPL (3) is made by integrating and optimizing cut editing EPL, mosaic editing EPL and Japanese subtitle editing EPL, having been described above with FIGS. 12 to 14. They will not be described in detail.

In addition, the EPLs (2-a), (2-b) and (2-d) can be integrated and optimized by the Japanese/English subtitle EPL integrating/optimizing unit 127 to make an English subtitle similar to the Japanese version. This will not be described herein.

Next, optimization and integration of edit sections and edit points in the concrete examples of EPL will be described in detail with reference to FIG. 10. FIG. 10 shows EPLs corresponding to a logging EPL shown in FIG. 11, cut editing EPL shown in FIG. 12 and integrating/optimizing EPL shown in FIG. 14, respectively.

As shown in FIGS. 10 and 11, a logging material includes a first edit section E1, second edit section E2, third edit section E3, fourth edit section E4 and a fifth edit section E5, each set for a source material. Also, a curt editing material includes a first edit section E1', second edit section E2', third edit section E3', fourth edit section E4' and a fifth edit section E5', each set for the logged material as shown in FIGS. 10 and 12. It should be noted that in FIG. 10, the fourth edit section E4, fifth edit section E5, third edit section E3', fourth edit section E4' and fifth edit section E5' are omitted for the convenience of illustration and description.

As having been described above, the cut editing EPL shown in FIG. 12 is information specifying how the logging time codes "00:00:00.07-00:00:52.21" are assigned to the cut-editing time codes "00:00:00.00-00:00:45.00". The online editing actually effected by the editor is not such that a logging material is made of a source material and a cut-editing material is made of the logging material, but such that a source material is edited and a cut-editing material is made as a result of the source-material editing. That is, the final editing information the editor desires is a relationship in time code between a source material and a cut-editing material. In other words, the editing information the editor desires is information indicating how a time code of the edit-result material is assigned to a one of the source material.

For explanation of the EPL integrating and optimizing processes, especially the first edit section E1' set for the logging material in order to make a cut-editing material from the logging material will be described with reference to FIG. 10. The first edit section E1' includes the first edit section E1, second edit section E2 and third edit section E3, each set for a source material. Namely, for representing the first section E1' of the cut-editing material with a time code of the source material, three edit sections "00:00.00-00:02.23", "00:02.23-00:20.06" and "00:20.06-00:23.04" are required. Therefore, in a final EPL, the first edit section E1' has to be stated using the time codes of the above three edit sections in order to show how the time code of the edit-result material is correlated with the time code of the source material.

That is to say, in the above examples of edit sections and points, the EPL integration and optimization are to re-set edit sections and points, and time codes so that time codes of an edit-result material care be correlated with a source material. In the above examples, when the edit sections and points are re-set, they are increased in number. However, they are not always increased in number. In case edit sections reset by the EPL integration and optimization are consecutive, the numbers of them are smaller as the case may be. Alternatively, when the re-set edit sections overlap each other, the number of edit points is smaller in some cases. Also, the above examples show the integration and optimization of edit points and sections. However, the present invention is not limited to the examples but integration and optimization are done in the editing-related image processing and transform.

In the examples shown in FIGS. 10 to 16, the cut editing is effected in two steps. The provisional-editing joints are kept as they are, not re-joined by a regular editing, and thus many edit points are found.

Also in the examples, all the material, titler and effector are acquired from the same server. They are all existent in an LAN in which the edit execution unit is also provided, which is not specified. It is expected that materials will be acquired from remote servers, which is a safe measure from the viewpoint of the system running.

An example of the EPL integration and optimization for NTSC-oriented material conversion is shown for reference in FIG. 17. Since the EPL integration and optimization are intended for the NTSC system, the formats for the processing and output are both "#525i" irrespectively of the video format "#1080i" at the material source. Therefore, the EPL integration will result in an EPL (3) having a statement of "down converter" at the end thereof. Also, in case the processing sequence is obvious, connection of statements using "plug( )" and "jack( )" is required.

Thus, in the content forming system 120 whose construction is illustrated in FIG. 9, the EPL editing can be effected various editing units sharing the work of editing since materials are not directly processed but the editing units can go on with its shared EPL editing process simultaneously. Also, in an EPL made by each of the editing units, a video format of an output is identified with a scan format. Thus, any input material can freely be selected. Also, output videos of multiple formats can be acquired simultaneously.

Figure 18:
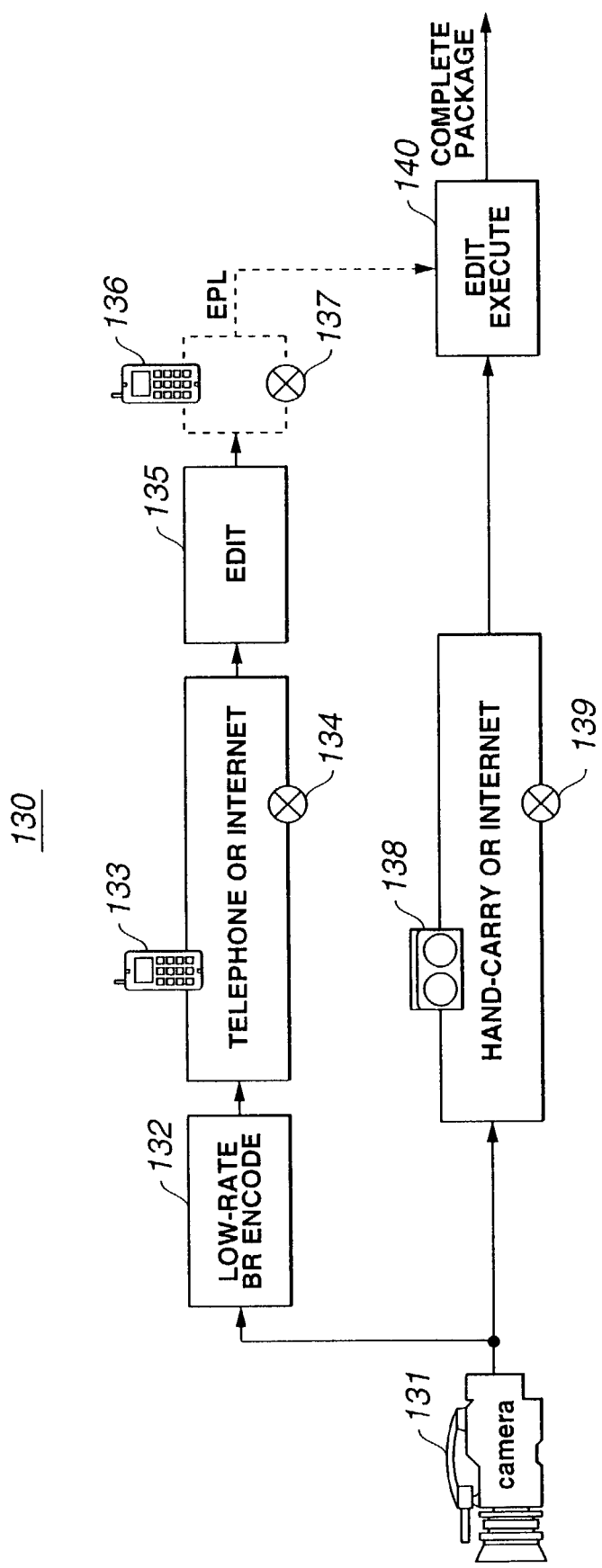
FIG. 18 shows another concrete example of the editing at a remote place.

As a concrete example of the editing at a remote place, a content forming system 130 as shown in FIG. 18 can be provided in addition to the content forming system 60 shown in FIG. 8. In this content forming system 130, a material including video and/or audio data, picked up by a video camera 131, is compressed by a low-rate encoder 132, and sent as a sub material to an editing unit 135 via a mobile telephone 133 or Internet 134. In the editing unit 135, the sub material is played back, rewound or fast forwarded as desired, and an EPL is made while viewing a video displayed on a monitor. The EPL includes identification information for identification of materials to be used in editing, and a format declare statement for defining the format of at least a certain material. The EPL thus made is sent to an edit execution unit 140 via a mobile telephone 136 or Internet 137. To the edit execution unit 140, there will be also sent a material from the video camera 131 via hand-carry of a video tape 138 or via the Internet 139. Having the above material stored in an internal server thereof, the edit execution unit 140 can edit it using the EPL.

As having been described in the foregoing, the previously mentioned problem can be solved by stating, in an EPL, a UMID for identification of a material used in editing and output, and a UTID for identification of an input material and video format of output.

Next, the present invention will be described concerning the prevention of image deterioration as a problem to be solved.

For example, after joining some cuts (video scenes) to a picture picked up by a video camera (cut editing) and superimposing telop characters (telop editing), data compression and expansion (decompression) will be repeated until a complete video is broadcast, which will cause deterioration of the image quality. This concrete example will be explained with reference to the process transition chart shown in FIG. 19. First, a picture picked by a video camera 150 is compressed by bit rate reduction (BRR) encoder (enc) 151, and recorded as a video material to a video tape 152. For cut editing the video material (in the video tape 152), the compressed video material is once expanded (decompressed) by a decoder (dec) 153 and then subjected to a cut editing by an editing unit (Edit1) 154. The cut-edited video material is compressed again by an encoder 155 and then recorded as a video material to a video tape 156. Next, for telop editing the video material (in the video tape 156), the compressed video material is expanded again by a decoder (dec) 157 and then a telop is superimposed by an editing unit (Edit 2) 158. The telop-edited video material is compressed again by an encoder 159, and then recorded as a video material to a video tape 160. Since the video material (recorded in the video tape 160) is converted to a broadcast NTSC format according to a broadcasting date, it is decoded once by a decoder 161, encoded to the NTSC format by an encoder 162, and sent as TV broadcast wave from a ground-wave antenna 163 for example. With this series of processes, the video material has been compressed 4 times, and expanded 3 times. This will cause the image deterioration.

Figure 20:
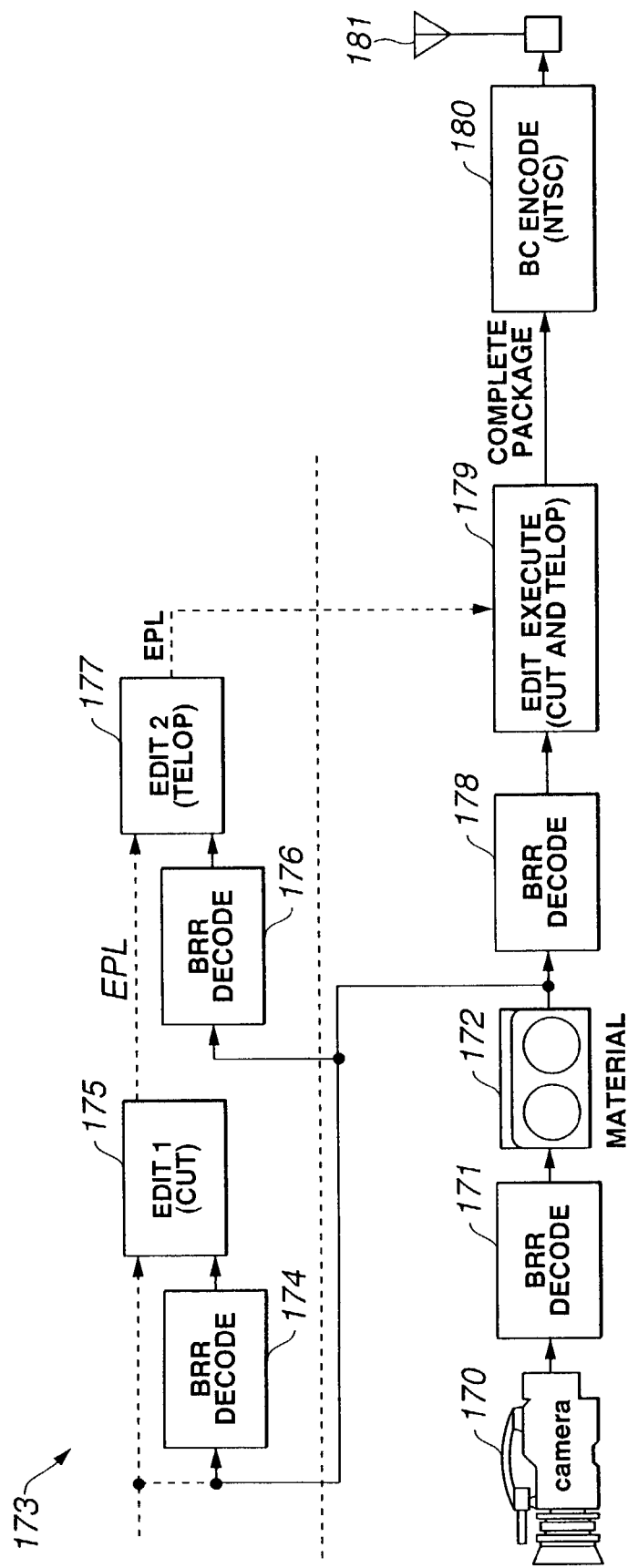
FIG. 20 shows a concrete example of content forming apparatus/method according to the present invention, in which the problem of image deterioration is solved.

The content forming apparatus and method according to the present invention can effectively solve this problem of image deterioration. FIG. 20 shows a concrete example of the prevention of image deterioration. In the example, a material including video and/or audio data, picked up by a video camera 170, is compressed by a BRR encoder (enc) 171, and recorded as a video material to a video tape 172. The video material (recorded in the video tape 172) is sent to an EPL maker 173.

The EPL maker 173 makes an EPL for cut editing and telop editing. For cut editing of the video material from the video tape 172, the compressed video material is expanded (decompressed) once by a BRR decoder (dec) 174. Then an editing unit (Edit 1) 175 makes the cut editing of the decompressed video material. This cut editing is effected by making the EPL. Also, the telop editing is effected by a telop editing unit 177 using the Epl made by the cut editing unit (Edit 1) 175. More specifically, the telop editing unit 177 makes a telop editing EPL while monitoring the material decoded by a BRR decoder 176.

The EPL made by the EPL maker 173 is sent to an edit execution unit 179 having also a material decoded by a BRR decoder 178 supplied thereto. The edit execution unit 179 makes cut editing and telop editing of the material according to the EPL, and sends the results of the cut editing and telop editing to a BC NTSC encoder 180. Then, data converted to NTSC format by the BC NTSC encoder 180 is transmitted as TV broadcast wave from a ground-wave antenna 181 for example. With this series of processes, the video material has been compressed only 2 times and decoded substantially only once.

Figure 19:
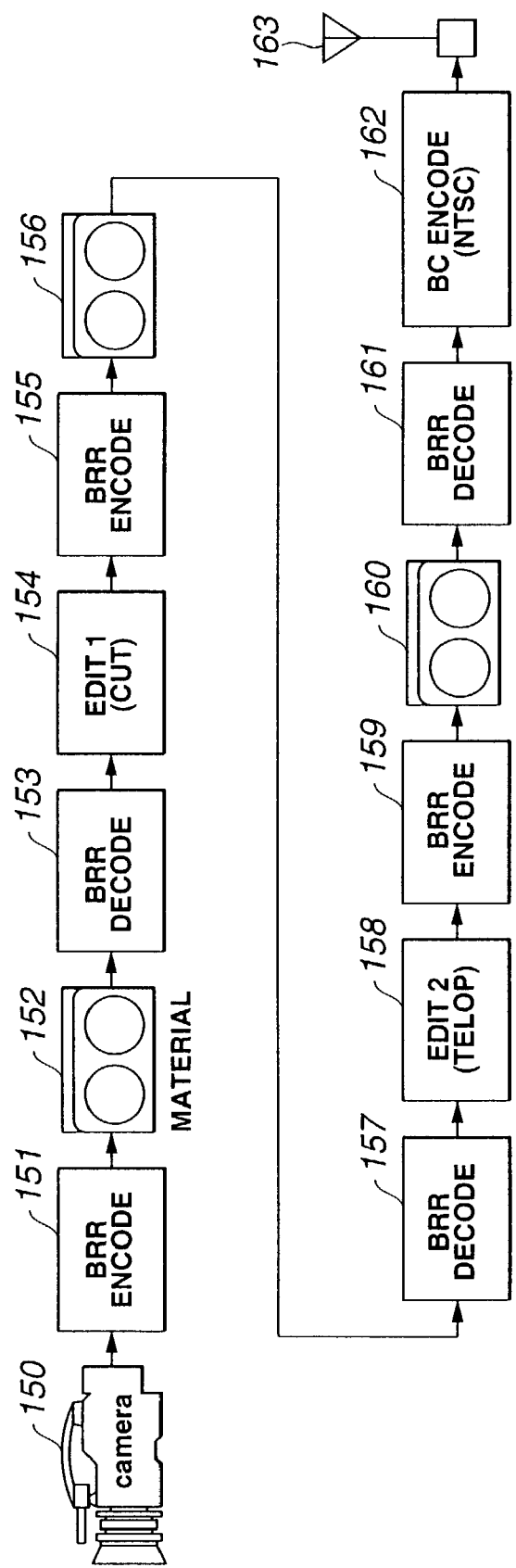
FIG. 19 shows how to solve the problem of image deterioration.

Therefore, the content forming system shown in FIG. 20 can work with less image deterioration than the conventional system shown in FIG. 19. That is, since the compression and decompression are not repeated so often in the course of editing than in the conventional system, the image quality can be maintained with less deterioration.

Also, the content forming apparatus and method according to the present invention can work with maintenance of an image quality in simulcasting of a common program on two systems whose formats are different from each other, for example. The simulcasting will be described below with reference to FIGS. 21 and 22.

Figure 21:
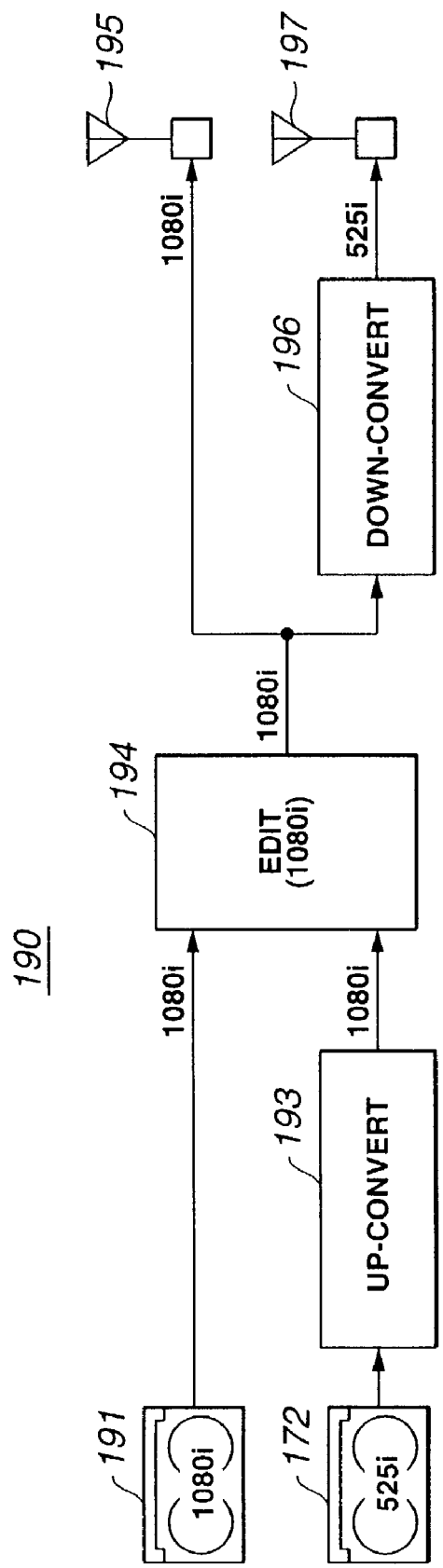
FIG. 21 shows a conventional system for simulcasting a program in both NTSC and high-definition (Hi-vision) formats.

FIG. 21 shows a conventional system for simulcasting a program in both NTSC and high-definition (Hi-vision) formats. The simulcasting system is generally indicated with a reference 1990. As shown, in the simulcasting system 190, a video in Hi-vision format "1080i", read from a video tape 191, and a video resulted of up-conversion by an up-converter 193 of a video in NTSC format "525i", read from a video tape 192 to the format "1080i", undergo an editing by an editing unit 194. The editing unit 194 edits the videos in the format "1080i" to produce an output video in the Hi-vision format. The output video is transmitted as a broadcast wave from an antenna 195, while being down-converted to "525i" by a down-converter 196 for transmission as a broadcast wave from an antenna 197.

Thus, in the system 190, the video in the NTSC format "525i" is up-converted once to "1080i", and then edited in the format "1080i". The output in the format "1080i" is down-converted to the NTSC format "525i". The video in the NTSC format is also edited in the format "1080i" and converted to "525i" before broadcasting.

Figure 22:
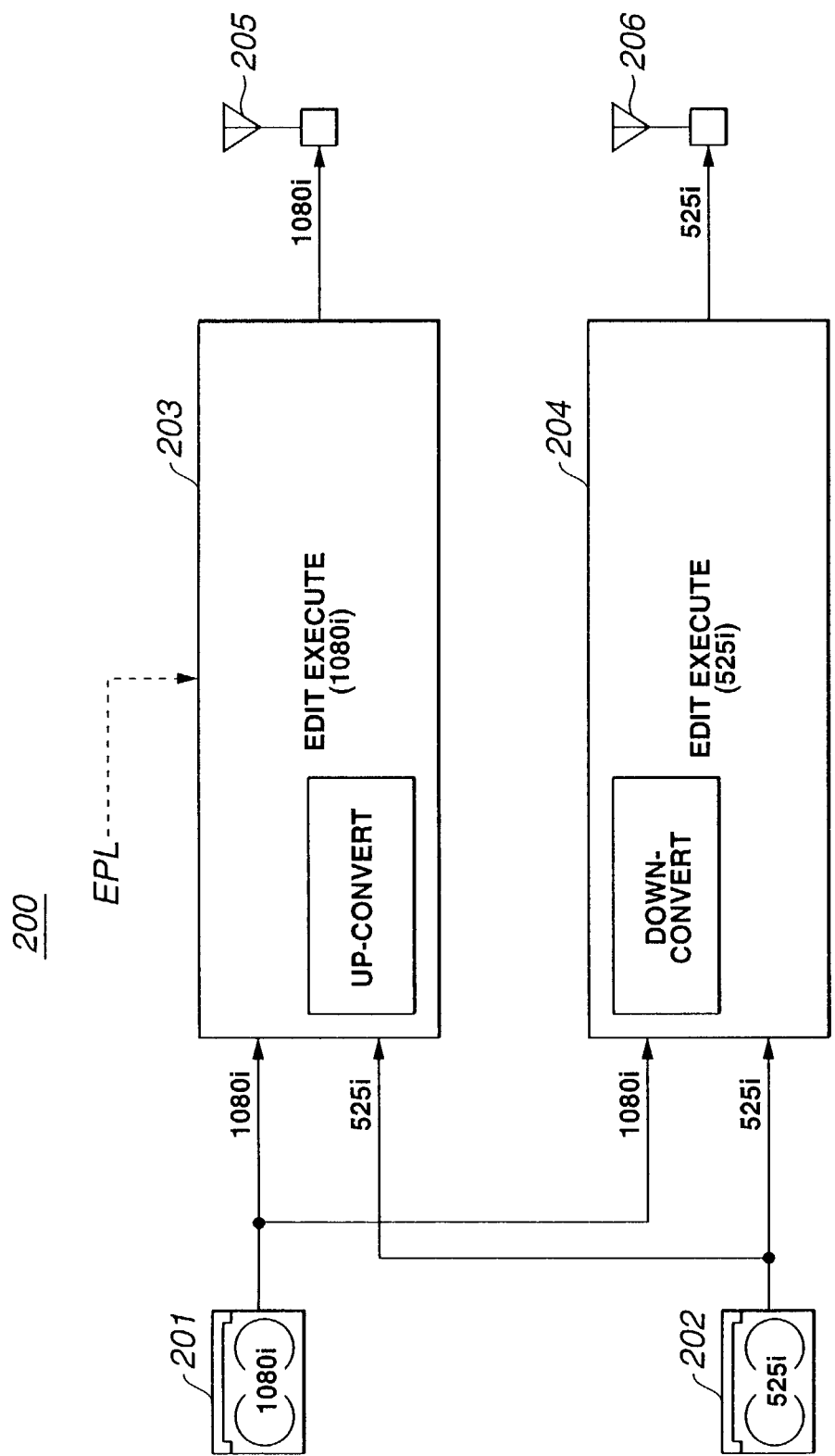
FIG. 22 shows a simulcasting system including the content forming apparatus and method according to the present invention.

FIG. 22 shows a simulcasting system including the content forming apparatus and method according to the present invention. The simulcasting system is generally indicated with a reference 200. This system can work with no image deterioration of NTSC video. As shown, when edit execution units 203 and 204 execute editing based on an EPL made by the Epl maker 10 shown in FIG. 1 for example, the content forming system 200 can produce the edited video in the NTSC format "525i" without repetition of up-conversion and down-conversion.

The video format conversion from an HD image (1080i) to SD image (525i) or vice versa, made by the edit execution units 203 and 204 in the system 200 will be described below with reference to FIG. 23.

Figure 23:
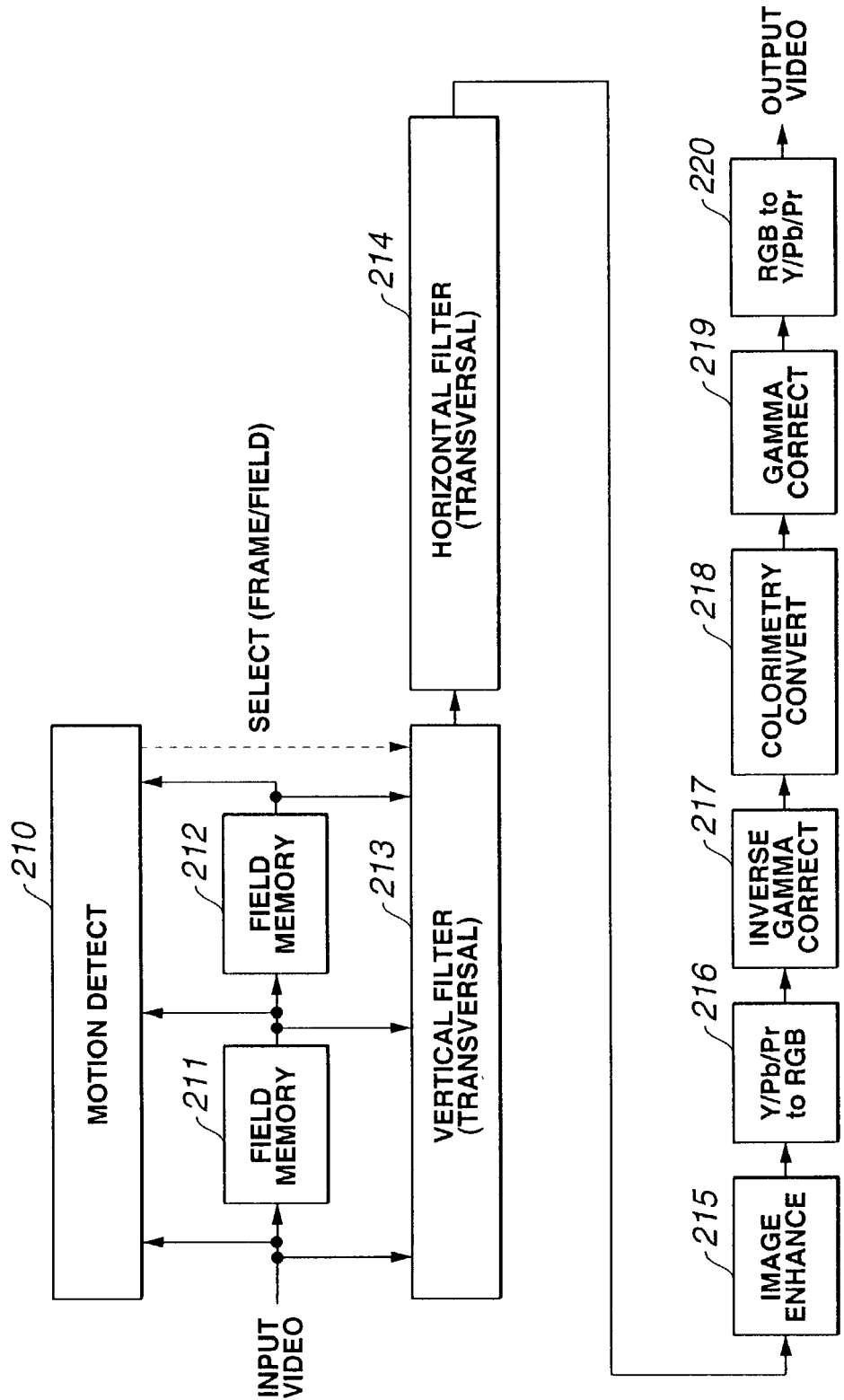
FIG. 23 explains the video format conversion from an HD image (1080i) to SD image (525i) or vice versa.

As shown in FIG. 23, an input video signal is stored into field memories 211 and 212 in this order. A motion detector 210 is provided to detect a motion from field images between which a time difference along the time axis has been given by the field memories 211 and 212. A frame/field tap select signal indicating that the result of motion detection by the motion detector 210 has shown a motion of a frame image, is supplied to a transversal type vertical filter 213. The transversal type vertical filter 213 makes vertical filtering of the field images between the time difference has been given by the field memories 211 and 212, based on the frame/field tap select signal. The output from the vertical filter 213 is supplied to a transversal type horizontal filter 214 which will make horizontal filtering of the vertical filter output. The output from the horizontal filter 214 is supplied to an image enhance unit 215.

The image enhance unit 215 enhances high-press component of the horizontal filter output. The output from the image enhance unit 215 is supplied to an image signal converter 216 which will convert Y/Pb/Pr to an RGB signal. The RGB signal is supplied to an inverse gamma correction unit 217 which will make inverse gamma correction of the RGB signal. The output from the inverse gamma correction unit 217 is supplied to a colorimetry converter 218 which will make colorimetry conversion of the output from the inverse gamma correction unit 217. The output from the colorimetry converter 218 is supplied to a gamma correction unit 219.

The gamma correction unit 219 makes gamma correction of the output from the colorimetry converter 218 and supplies it to an image signal converter 220 which will convert the RGB data into a Y/Pb/Pr signal. The Y/Pb/Pr signal is an output video signal.

Therefore, the process effected in the image signal converter 216 or 220 in the construction shown in FIG. 23 can be changed to down or up conversion.

INDUSTRIAL APPLICABILITY

In the content forming apparatus and method according to the present invention, identification information for identification of materials used in editing and edit output, identification information for identification of a processing method and a format declare statement for identification of an input material and output video format are stated in an edit decision list. Thus, since a material can be acquired based on its ID in forming a content, it is possible during editing not to transmit any large volume of image data. Also, by acquiring a material when it becomes necessary to actually form a content, copyright protection and billing can be made. Since a processing method can be cited based on its ID, any editing environment (abilities of the equipment) will do. Also, copyright protection and billing can be made for the processing method itself. Also, any input material can freely be selected. Also, outputs in multiple formats can be acquired simultaneously. Also, since an EPL is made at a low level of image quality, it can be made in any place and environment. Since any material is not directly processed, multiple groups distributed at different locations can share the work of editing a content.

Also, in the edit decision list making method according to the present invention, the content of an edit is defined using at least identification information for identification of an edit output and a format declare statement for identification of a format, an input material is defined using at least identification information for identification of an input material and a format declare statement for identification of an input material format, and processes to be applied to the input material are defined. So, an edit decision list for forming a content can be made with prevention of image data degradation, supporting multiple image data formats, having not to pool any material once on hand and with capability of switching processes from one to another.

Since identification information for identification of a material used in editing and edit output, identification information for identification of a processing method and a declare statement for identification of an input material and output video format are stated in an edit decision list, a material can be acquired based on its ID in forming a content during editing and it is possible during editing not to transmit any large volume of image data. Also, by acquiring a material when it becomes necessary to actually form a content, copyright protection and billing can be made. Since a processing method can be cited based on its ID, any editing environment (abilities of the equipment) will do. Also, copyright protection and billing can be made for the processing method itself. Also, any input material can freely be selected. Also, outputs in multiple formats can be acquired simultaneously. Also, since an EPL is made at a low level of image quality, it can be made in any place and environment. Since any material is not directly processed, multiple groups distributed at different locations can share the work of editing a content.

Also, in the content forming apparatus according to the present invention, distributed edit decision lists made by distributed edit decision list making means at other distributed locations are integrated and optimized by an edit decision list making means to make a final edit decision list of a hierarchical structure, and a content of an arbitrary format is formed by a content making means based on the edit decision list. Since in the edit decision list and/or distributed edit decision lists, there are stated identification information for identification of a material used in editing and a format declare statement for identification of a format of at least a certain material, a content in an arbitrary format can be formed with supporting multiple image data formats, having not to pool any material once on hand and with capability of switching processes from one to another.

Also, in the content forming method according to the present invention, distributed edit decision lists made using multiple video and/or audio materials at distributed edit decision list making steps at other distributed locations are integrated and optimized at an edit decision list making step to make a final edit decision list of a hierarchical structure, and a content of an arbitrary format is formed at a content making step based on the edit decision list. Since in the edit decision list and/or distributed edit decision lists, there are stated identification information for identification of materials used in editing and a format declare statement for identification of a format of at least a certain material, a content in an arbitrary format can be formed with supporting multiple image data formats, having not to pool any material once on hand and with capability of switching processes from one to another.

Note that the present invention is not limited to the aforementioned embodiments, but can be modified or varied in various forms without departing from the spirit and scope thereof as set forth in claims given later.

The invention claimed is:

1. A content forming apparatus for forming a content from multiple video and/or audio materials, the apparatus comprising:
   means for making an edit decision list for the video and/or audio materials;
   an edit controlling means for making an edit control signal based on the edit decision list made by the edit decision list making means; and
   means for forming a content in a predetermined material format from the material based on the edit control signal from the edit controlling means; and
   means for displaying the formed content in the predetermined material format,
   wherein the edit decision list includes identification information that identifies a material for use in editing, and a format declare statement that defines a format of at least a certain material,
   wherein the edit decision list defines a plurality of image processes including a first code that indicates multiple processes are sequentially performed and a second code that indicates multiple processes are performed in parallel,
   wherein the edit decision list provides an identification code indicating an image processing method that states a process to be applied to the material with a globally unique identification code of the same system, and
   wherein the identification code is a unique transform identifier (UTID) that is a result of editing by the edit decision list and a unique material identifier (UMID).

2. The apparatus according to claim 1, wherein the material identification information is a globally unique identification code and an identification code for identification of a material processing method is determined according to the identification code system.

3. The apparatus according to claim 1, wherein the format declare statement includes an image format of an input video material and/or an image format of an edit-output material.

4. The apparatus according to claim 3, wherein the image format is a scan format including at least a time for one frame during capturing, a capturing shutter speed, numbers of vertical and longitudinal pixels of an image and an aspect ratio item of each of the pixels.

5. The apparatus according to claim 1, wherein sub materials resulted from high compression of the material are used for making an edit decision list of the material.

6. The apparatus according to claim 1, wherein a source from which the material is acquired is embedded in the edit decision list and specified by either a path in an editing system or an address of an external server connected via a network.

7. The apparatus according to claim 1, wherein the edit decision list is of a hierarchical structure allowing any other existing edit decision list to be stated with an additional globally unique identification code that identifies the edit decision list itself.

8. A content forming method of forming a content from multiple video and/audio materials, the method comprising steps of:
   making on an editing terminal an edit decision list for the video and/or audio materials;
   making on an editing controller an edit control signal based on the edit decision list made at the edit decision list making step;
   forming a content in a predetermined material format from the material based on the edit control signal made at the edit controlling step; and
   displaying on a display device the formed content in the predetermined material format,
   wherein the edit decision list includes identification information that identifies a material for use in editing, and a format declare statement that defines a format of at least a certain material,
   wherein the edit decision list defines a plurality of image processes including a first code that indicates multiple processes are sequentially performed and a second code that indicates multiple processes are performed in parallel,
   wherein the edit decision list provides an identification code indicating an image processing method that states a process to be applied to the material with a globally unique identification code of the same system, and
   wherein the identification code is a unique transform identifier (UTID) that is a result of editing by the edit decision list and a unique material identifier (UMID).

9. An edit decision list making method for forming a content from multiple video and/or audio materials, the method comprising steps of:
   defining on an editing terminal how the editing is to be done using at least identification information from identification of an edit output and a format declare statement for identification of a format;
   defining on an editing controller a process to be applied to an input material while defining the input material using at least identification information for identification of the input material and a format declare statement for identification of a format of the input material; and
   providing the defined process to form a content from multiple video and/or audio materials; and
   displaying the content on a display device,
   wherein the edit decision list defines a plurality of image processes including a first code that indicates multiple processes are sequentially performed and a second code that indicates multiple processes are performed in parallel, wherein the process defining step provides an identification code indicating an image processing method that is to state a process to be applied to the input material with a globally unique identification code of the same system, and wherein the identification code is a unique transform identifier (UTID) that is a result of editing by the edit decision list and a unique material identifier (UMID).

10. The method according to claim 9, wherein the output identification information and input material identification information are globally unique identification codes, respectively, of the same system.

11. The method according to claim 9, wherein the process defining step is to define multiple input materials using at least the identification information and format declare statement and state a process to be applied to each of the input materials with globally unique identification codes of the same system.

12. The method according to claim 9, wherein: the format declare statement for identification of how to process includes an image format of an edit output video; and the format declare statement for identification of the input material includes an image format of an input video material.

13. The method according to claim 12, wherein the image format is a scan format including at least a time for one frame during capturing, a capturing shutter speed, numbers of vertical and longitudinal pixels of an image and an aspect ratio item of each of the pixels.

14. The method according to claim 9, wherein sub materials resulted from high compression of the input material defined at the process defining step are used for making an edit decision list.

15. The method according to claim 9, further including a step of making an edit decision list by integrating and optimizing at least two edit decision lists having been made at the edit defining step and process defining step.

16. The method according to claim 15, wherein identification information is added to the at least two edit decision lists.

17. The method according to claim 15, wherein at least the two edit decision lists have stated therein a position for transfer to an upper edit decision list and/or a position for reception of a lower edit decision list.

18. The method according to claim 15, wherein the at least two edit decision lists are made at distributed locations.

19. The method according to claim 15, wherein the at least two edit decision lists are made in parallel.

20. The method according to claim 15, wherein at the integrating/optimizing step, there is made an integrating/optimizing edit decision list of a hierarchical structure allowing to state, in the edit decision list, any other existing edit decision list to be stated with an additional globally unique identification code for identification of the edit decision list itself.

21. The method according to claim 15, wherein the integrating/optimizing step is to make a hierarchical-structured integrating/optimizing edit decision list of the at least two edit decision lists.

22. The method according to claim 21, wherein the integrating/optimizing step is to make a hierarchical-structured integrating/optimizing edit decision list based on the at least two edit decision lists received via a network.

23. A content making apparatus comprising:

means for making a final edit decision list of a hierarchical structure by integrating and optimizing distributed edit decision lists made of multiple video and/or audio materials at other distributed locations;

means for making the distributed edit decision list of a material corresponding to the edit decision list made by the edit decision list making means;

means for forming a content in an arbitrary format based on the edit decision list made by the edit decision list making means; and means for displaying the formed content in the arbitrary format, wherein the edit decision list and/or distributed edit decision list includes identification information that identifies a material for use in editing and a format declare statement that defines a format of at least a certain material, wherein the edit decision list and/or distributed edit decision list defines a plurality of image processes including a first code that indicates multiple processes are sequentially performed and a second code that indicates multiple processes are performed in parallel, wherein an identification code for identification of a material processing method is determined according to the globally unique identification information of the same system, and wherein the identification code is a unique transform identifier (UTID) that is a result of editing by the edit decision list and a unique material identifier (UMID).

24. The apparatus according to claim 23, wherein the edit decision list made by the edit decision list making means and distributed edit decision list made by the distributed edit decision list making means are stored as a file in a program folder and transmitted via a network.

25. The apparatus according to claim 23, further comprising multiple distributed edit decision list making means.

26. The apparatus according to claim 23, further comprising means for storing/retrieving a content in a predetermined format, made based on the edit decision list having been made by the edit decision list making means.

27. The apparatus according to claim 23, wherein the format declare statement includes an image format of an input video material and/or an image format of an edit output.

28. The apparatus according to claim 27, wherein the image format is a scan format including at least a time for one frame during capturing, a capturing shutter speed, numbers of vertical and longitudinal pixels of an image and an aspect ratio item of each of the pixels.

29. The apparatus according to claim 23, wherein sub materials resulted from high compression of the material are used for making an edit decision list of the material.

30. The apparatus according to claim 23, wherein a source from which the material is acquired is embedded in the edit decision list and specified by either a path in an editing system or an address of an external server connected via a network.

31. A content making method comprising steps of:

making on an editing terminal a final edit decision list of a hierarchical structure by integrating and optimizing distributed edit decision lists made of multiple video and/or audio materials at other distributed locations;

making the distributed edit decision list of materials corresponding to the edit decision list made at the edit decision list making step;

forming a content on an editing controller in an arbitrary format based on the edit decision list made at the edit decision list making step;

displaying on a display device the formed content in the arbitrary format, wherein the edit decision list and/or distributed edit decision list includes identification information that identifies a material for use in editing and a format declare statement that defines a format of at least a certain material, wherein the edit decision list and/or distributed edit decision list defines a plurality of image processes including a first code that indicates multiple processes are sequentially performed and a second code that indicates multiple processes are performed in parallel, wherein an identification code for identification of a material processing method is determined according to the globally unique identification information of the same system, and wherein the identification code is a unique transform identifier (UTID) that is a result of editing by the edit decision list and a unique material identifier (UMID).

32. An editing information making apparatus comprising:

means for receiving information as to multiple editing processes to be applied to a source video material;

means for making, based on the information as to the editing processes, a declare statement written by correlating identification information for identification of the source video material with a language for defining multiple editing processes to be applied to the source video material;

means for editing the source video material based upon the declare statement; and means for displaying the edited source video material, wherein the declare statement defines a plurality of image processes including a first code that indicates multiple processes are sequentially performed and a second code that indicates multiple processes are performed in parallel, and wherein the editing processes provide an identification code indicating an image processing method that state a process to be applied to the input material with a globally unique identification code of the same system, and wherein the identification code is a unique transform identifier (UTID) that is a result of editing by the edit decision list and a unique material identifier (UMID).

33. An editing information making method comprising steps of:

receiving information as to multiple editing processes to be applied to a source video material;

making on an editing terminal, based on the information as to the editing processes, a declare statement written by correlating identification information for identification of the source video material with a language for defining multiple editing processes to be applied to the source video material;

editing the source video material on an editing controller based upon the declare statement; and displaying on a display device the edited source video material, wherein the declare statement defines a plurality of image processes including a first code that indicates multiple processes are sequentially performed and a second code that indicates multiple processes are performed in parallel, wherein the editing processes provide an identification code indicating an image processing method that state a process to be applied to the input material with a globally unique identification code of the same system, and wherein the identification code is a unique transform identifier (UTID) that is a result of editing by the edit decision list and a unique material identifier (UMID).

34. An editing information making apparatus comprising:

means for receiving information as to multiple editing processes to be applied to a source video material; and means for making, based on the information as to the editing processes, a statement that specifies execution of the multiple editing processes to be written in a predetermined descriptive language for identification of how to process and what to edit in the multiple editing processes; and means for editing the source video material based upon the statement; and means for displaying the edited source video material, wherein the declare statement defines a plurality of image processes including a first code that indicates multiple processes are sequentially performed and a second code that indicates multiple processes are performed in parallel, wherein the editing processes provide an identification code indicating an image processing method that state a process to be applied to the input material with a globally unique identification code of the same system, and wherein the identification code is a unique transform identifier (UTID) that is a result of editing by the edit decision list and a unique material identifier (UMID).

35. An editing information making method comprising steps of:

receiving information as to multiple editing processes to be applied to a source video material;

making on an editing terminal, based on the information as to the editing processes, a statement that specifies execution of the multiple editing processes to be and written in a predetermined descriptive language for identification of how to process and what to be edited in the multiple editing processes; and editing the source video material on an editing controller based upon the statement; and displaying on a display device the edited source video material, wherein the declare statement defines a plurality of image processes including a first code that indicates multiple processes are sequentially performed and a second code that indicates multiple processes are performed in parallel, wherein the editing processes provide an identification code indicating an image processing method that state a process to be applied to the input material with a globally unique identification code of the same system, and wherein the identification code is a unique transform identifier (UTID) that is a result of editing by the edit decision list and a unique material identifier (UMID).

* * * * *